US010019067B2

(12) United States Patent
Yoon et al.

(10) Patent No.: US 10,019,067 B2
(45) Date of Patent: Jul. 10, 2018

(54) METHOD AND APPARATUS FOR PERFORMING COMMUNICATION SERVICE BASED ON GESTURE

(71) Applicant: SAMSUNG ELECTRONICS CO., LTD., Suwon-si (KR)

(72) Inventors: Yeo-jun Yoon, Seoul (KR); Nipun Kumar, Suwon-si (KR); Yong-yeon Lee, Suwon-si (KR); Young-joon Choi, Uiwang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 296 days.

(21) Appl. No.: 14/295,387

(22) Filed: Jun. 4, 2014

(65) Prior Publication Data

US 2014/0365979 A1   Dec. 11, 2014

(30) Foreign Application Priority Data

Jun. 11, 2013   (KR) .......................... 10-2013-0066264

(51) Int. Cl.
  *G06F 3/01*  (2006.01)
  *H04M 1/725*  (2006.01)
  *H04W 4/21*  (2018.01)
  *G06F 1/16*  (2006.01)

(52) U.S. Cl.
  CPC .............. *G06F 3/017* (2013.01); *G06F 3/011* (2013.01); *G06F 3/014* (2013.01); *G06F 3/015* (2013.01); *H04M 1/7253* (2013.01); *H04M 1/72569* (2013.01); *H04W 4/21* (2018.02); *G06F 1/1694* (2013.01); *H04M 2250/64* (2013.01)

(58) Field of Classification Search
  CPC ........................................................ G06F 3/01
  See application file for complete search history.

(56) References Cited

U.S. PATENT DOCUMENTS

| 8,219,028 B1 | 7/2012 | Flamholz |
| 2008/0195735 A1 | 8/2008 | Hodges et al. |
| 2010/0013762 A1* | 1/2010 | Zontrop .................. A63F 13/12 345/156 |
| 2010/0167646 A1 | 7/2010 | Alameh et al. |

(Continued)

FOREIGN PATENT DOCUMENTS

| KR | 10-2011-0091570 A | 8/2011 |
| KR | 10-1105297 B1 | 1/2012 |
| WO | 2010/078094 A1 | 7/2010 |

OTHER PUBLICATIONS

Communication from the European Patent Office dated Nov. 11, 2014, in a counterpart European Application No. 14170920.4.

(Continued)

*Primary Examiner* — David Choi

(74) *Attorney, Agent, or Firm* — Sughrue Mion, PLLC

(57) ABSTRACT

A method and an apparatus for performing gesture-based communication service are provided, in which a first device detects a first motion, and when the first motion corresponds to a first gesture that belongs to a gesture group, receives information about a second motion from a second device. The first device may perform an event that corresponds to a combination of the first and second gestures, when the received information corresponds to the second gesture that belongs to the gesture group.

31 Claims, 36 Drawing Sheets

(56) References Cited

U.S. PATENT DOCUMENTS

| | | | |
|---|---|---|---|
| 2011/0235926 A1* | 9/2011 | Yokono | G06K 9/00375 |
| | | | 382/225 |
| 2012/0139907 A1* | 6/2012 | Lee | G06F 3/0304 |
| | | | 345/419 |
| 2012/0282859 A1* | 11/2012 | Mayer | H04W 4/02 |
| | | | 455/41.2 |
| 2012/0327194 A1 | 12/2012 | Shiratori et al. | |
| 2013/0231088 A1* | 9/2013 | Jabara | G06Q 10/101 |
| | | | 455/411 |
| 2013/0273888 A1* | 10/2013 | Chou | H04W 76/021 |
| | | | 455/411 |
| 2014/0006954 A1* | 1/2014 | Raffa | G06F 3/04883 |
| | | | 715/733 |
| 2014/0149859 A1* | 5/2014 | Van Dyken | H04L 29/08117 |
| | | | 715/702 |
| 2014/0282270 A1* | 9/2014 | Slonneger | G06F 3/017 |
| | | | 715/863 |
| 2014/0304663 A1* | 10/2014 | Mishra | G06F 3/017 |
| | | | 715/863 |
| 2014/0335490 A1* | 11/2014 | Baarman | A61B 5/002 |
| | | | 434/236 |
| 2014/0365979 A1* | 12/2014 | Yoon | G06F 3/017 |
| | | | 715/863 |
| 2015/0019459 A1* | 1/2015 | Han | G06F 3/04883 |
| | | | 706/11 |

OTHER PUBLICATIONS

Communication dated Apr. 21, 2017 issued by the Korean Patent Office in counterpart Korean Patent Application No. 10-2013-006264.

* cited by examiner

FIG. 21
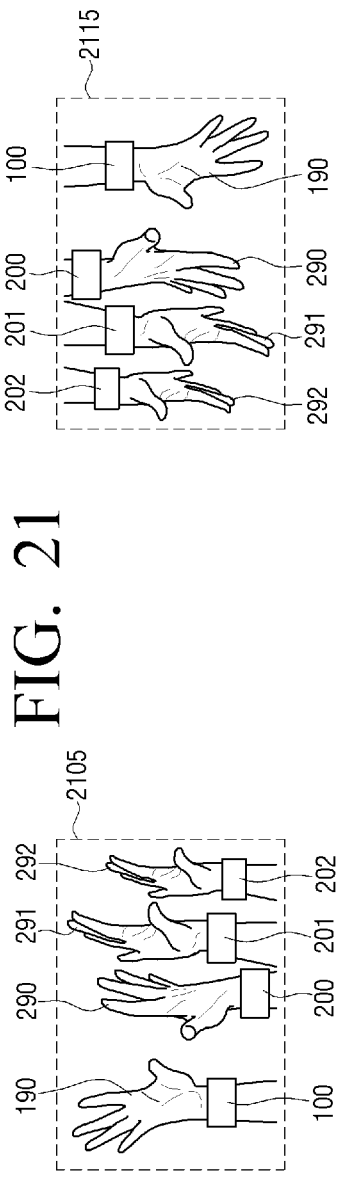
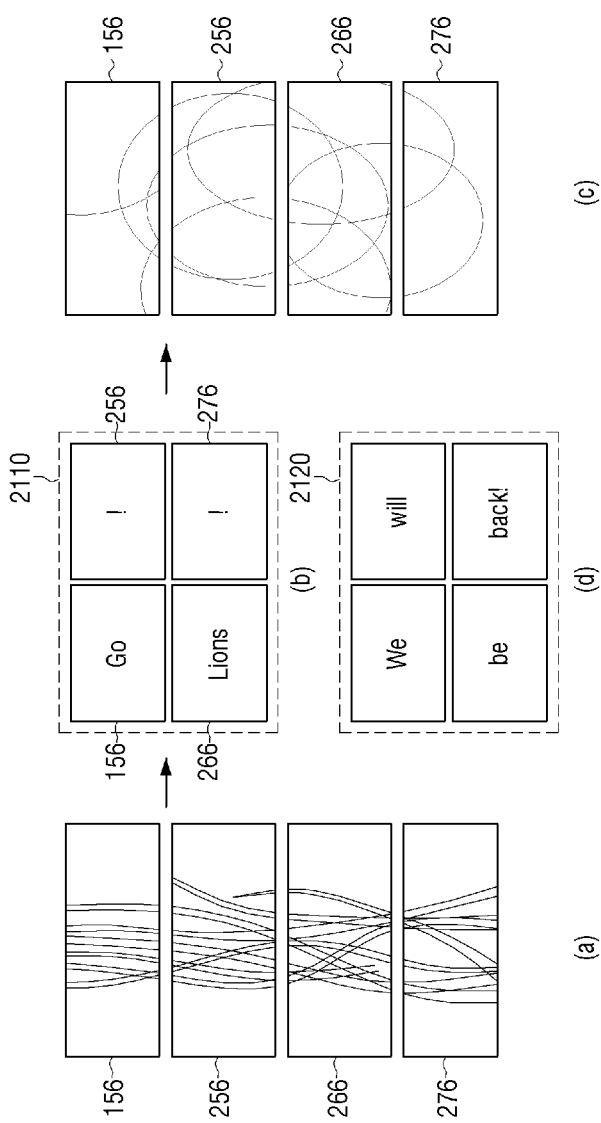

METHOD AND APPARATUS FOR PERFORMING COMMUNICATION SERVICE BASED ON GESTURE

CROSS-REFERENCE TO RELATED APPLICATION

This application claims priority from Korean Patent Application No. 10-2013-0066264, filed on Jun. 11, 2013, in the Korean Intellectual Property Office, the disclosure of which is incorporated herein by reference in its entirety.

BACKGROUND

1. Field

Methods and apparatuses consistent with what is disclosed herein relate to performing a communication service, and more particularly, to a method and an apparatus for performing communication services among devices based on gestures.

2. Description of the Related Art

A user interface is the technology that provides a user with temporary or continuous access to an object, a system, an apparatus or a program to have communication with the same.

An improved user interface is particularly being researched, which enables a user to manipulate an electronic apparatus with ease. The user can make input to an electronic apparatus or perceive output easily and rapidly, using the improved user interface.

The user interface for a mobile electronic device is designed in consideration of an environment that the user manipulates the device while gripping it. To enable the user to stably maintain gripping, the electronic apparatus generally uses stationary input such as touch or button input. For example, a mobile electronic apparatus may be provided with a touch screen for a user input, so as to be used along with an input unit such as fingertip or stylus pen.

Recently, user interactions have been introduced, according to which device or user motion is detected to be used in controlling the electronic apparatus. Accordingly, a method is necessary, which can detect a device's or user's various motions and utilize the same as user interfaces, thereby providing more intuitive and easier user experiences.

SUMMARY

Exemplary embodiments of the present inventive concept overcome the above disadvantages and other disadvantages not described above. Also, the present inventive concept is not required to overcome the disadvantages described above, and an exemplary embodiment of the present inventive concept may not overcome any of the problems described above.

According to one exemplary embodiment, a technical objective is to provide a method and an apparatus for performing communication service in a manner that allows convenient data transmission and reception among devices based on gestures.

Another technical objective is to provide a method and an apparatus for performing communication service in a manner that allows recognition of various gestures that are applicable in communication service.

Yet another technical objective is to provide a method and an apparatus for performing communication service in which events among devices are generated as intended by a user using gestures.

In one exemplary embodiment, a method for performing a communication service at a first device and a second device, the method comprising: detecting a first motion; when the first motion corresponds to a first gesture that belongs to a gesture group, receiving information about a second motion from the second device; and when the received information corresponds to a second gesture that belongs to the gesture group, performing an event that corresponds to a combination of the first gesture and the second gesture.

In one exemplary embodiment, the first motion comprises at least one from among: first shape information of a part of a body of a first user of the first device; first acceleration information with respect to the first device; and first direction information representing a direction where the first device moves, and the second motion comprises at least one from among: second shape information of a part of a body of a second user of the second device; second acceleration information with respect to the second device; and second direction information representing a direction where the second device moves.

In one exemplary embodiment, the first shape information and the second shape information may be each detected at the first device and the second device, respectively, with at least one from among an optical sensor and an electromyogram sensor.

In one exemplary embodiment, the detecting the first motion comprises detecting at least one from among: first shape information of a part of a body of a first user of the first device; first acceleration information with respect to the first device; and first direction information representing a direction where the first device moves.

In one exemplary embodiment, the first device and the second device may have at least one form from among a band shape, a wrist watch shape and a bracelet shape.

In one exemplary embodiment, the performing the event may be implemented when the received information corresponds to the second gesture and when a difference between a time point of detecting the first motion that corresponds to the first gesture and a time point of detecting the second motion that corresponds to the second gesture, is smaller than a time.

In one exemplary embodiment, the receiving the information about the second motion may include searching a service set identifier (SSID); and when failing to find the SSID, broadcasting the SSID.

In one exemplary embodiment, the combination of the first gesture and the second gesture may include first and second gestures which are substantially identical to each other.

In one exemplary embodiment, the combination of the first gesture and the second gesture may include first and second gestures with substantially identical trajectory and opposite directions of motion.

In one exemplary embodiment, further comprising: prior to the detecting the first motion, retaining, at a memory, one or more combinations of a plurality of gestures comprising the first gesture and the second gesture that belong to the gesture group.

In one exemplary embodiment, the one or more combinations may include sub gestures generated at two or more different devices, and when the sub gestures are generated together, a corresponding event may be performed.

In one exemplary embodiment, the method may additionally include, additionally retaining, at the memory, one or more independent gestures that are generated at one device and that correspond to an input event made to a user interface of the one device, separately from the one or more combinations.

In one exemplary embodiment, a first device for performing a communication service with a second device, may include a sensor configured to detect a first motion, a communicator configured so that, when the first motion corresponds to a first gesture that belongs to a gesture group, the communicator receives information about a second motion from the second device; and a controller configured so that, when the received information corresponds to a second gesture that belongs to the gesture group, the controller causes an event that corresponds to a combination of the first gesture and the second gesture to be performed.

In one exemplary embodiment, the first motion may include at least one from among: first shape information of a part of a body of a first user of the first device; first acceleration information with respect to the first device; and first direction information representing a direction where the first device moves, and the second motion may include at least one from among: second shape information of a part of a body of a second user of the second device; second acceleration information with respect to the second device; and second direction information representing a direction where the second device moves.

In one exemplary embodiment, the sensor and another sensor of the second device each may include at least one from among an optical sensor and an electromyogram sensor, and the first shape information and the second shape information are each detected at the first device and the second devices, respectively, with the at least one from among the optical sensor and the electromyogram sensor.

In one exemplary embodiment, the sensor may detect the first motion by detecting at least one from among: first shape information of a part of a body of a first user of the first device; first acceleration information with respect to the first device; and first direction information representing a direction where the first device moves.

In one exemplary embodiment, the first device and the second device may have at least one form from among a band shape, a wrist watch shape and a bracelet shape.

In one exemplary embodiment, the controller controls so that the event is implemented, when the received information corresponds to the second gesture and when a difference between a time point of detecting the first motion that corresponds to the first gesture and a time point of detecting the second motion that corresponds to the second gesture, is smaller than a time.

In one exemplary embodiment, prior to receiving the information about the second motion, the communicator may search a service set identifier (SSID), and when failing to find the SSID, broadcast the SSID.

In one exemplary embodiment, the combination of the first gesture and the second gesture may include first and second gestures which are substantially identical to each other.

In one exemplary embodiment, the combination of the first gesture and the second gesture may include first and second gestures with substantially identical trajectory and opposite directions of motion.

In one exemplary embodiment, further comprising a memory configured to retain one or more combinations of a plurality of gestures comprising the first and second gestures that belong to the gesture group, prior to the detecting the first motion.

In one exemplary embodiment, the one or more combinations may include sub gestures generated at two or more different devices, and when the sub gestures are generated together, a corresponding event is performed.

In one exemplary embodiment, the memory may additionally retain one or more independent gestures that are generated at one device and that correspond to an input event made to a user interface of the one device, separately from the one or more combinations.

In one exemplary embodiment, a method for performing a communication service at a first device with a second device, the method comprising: storing a gesture group that comprises a plurality of gestures corresponding to sequential events; detecting a motion; when identifying from the detected motion a first gesture that corresponds to a first event among the plurality of gestures, performing the first event by transmitting request information to the second device; and when a second gesture corresponding to a second event following the first event is generated at the second device among the plurality of gestures, performing the second event of receiving reply information transmitted from the second device.

In one exemplary embodiment, there is provided a first device for performing a communication service with a second device, the first device comprising: a memory configured to store a gesture group that comprises a plurality of gestures corresponding to sequential events; a sensor configured to detect a motion; a controller configured so that, when identifying from the detected motion a first gesture that corresponds to a first event among the plurality of gestures, the controller causes the first event to be performed, in which request information is transmitted to the second device; and a communicator configured so that, when a second gesture corresponding to a second event following the first event is generated at the second device among the plurality of gestures, the communicator performs the second event of receiving reply information transmitted from the second device.

In one exemplary embodiment, there is provided a method for performing a communication service at a second device with a first device, the method comprising: detecting a second motion; when the second motion corresponds to a second gesture that belongs to a gesture group, transmitting information about the second motion to the first device; and when detecting, at the first device, a first motion that corresponds to a first gesture belonging to the gesture group within a set time before or after detecting the second motion, performing an event that corresponds to a combination of the first and second gestures.

In one exemplary embodiment, there is provided a second device for performing a communication service with a first device, the second device comprising: a sensor configured to detect a second motion; a communicator configured so that, when the second motion corresponds to a second gesture that belongs to a gesture group, the communicator transmits information about the second motion to the first device: and a controller configured so that, when detecting, at the first device, a first motion that corresponds to a first gesture belonging to the gesture group within a time before or after detecting the second motion, the controller causes an event that corresponds to a combination of the first gesture and the second gesture to be performed.

In at least one of the exemplary embodiments, the second device may be located adjacent to the first device. Also, in at least one of the exemplary embodiments, the first gesture and the second gesture may be performed substantially simultaneously.

Because an event is performed in accordance with a combination of gestures generated at a plurality of different devices, users are provided with gesture-based communication service conveniently.

Further, because various gestures are identified using at least one of acceleration information of device, direction of motion and shape information of part of a user's body, users are provided with more subtle device operating environment and interesting user experience.

Further, because events among devices are generated in accordance with a combination of gestures or order the gestures are generated, intuitive communication service that meets the user's intention is provided.

The second device may be located adjacent to the first device.

The first gesture and the second gesture may be performed substantially simultaneously.

BRIEF DESCRIPTION OF THE DRAWINGS

The above and/or other aspects of the present inventive concept will be more apparent by describing certain exemplary embodiments of the present inventive concept with reference to the accompanying drawings, in which:

FIG. 21 illustrates a gesture and a visual feedback according to an exemplary embodiment;

DETAILED DESCRIPTION OF EXEMPLARY EMBODIMENTS

Figure 1A:
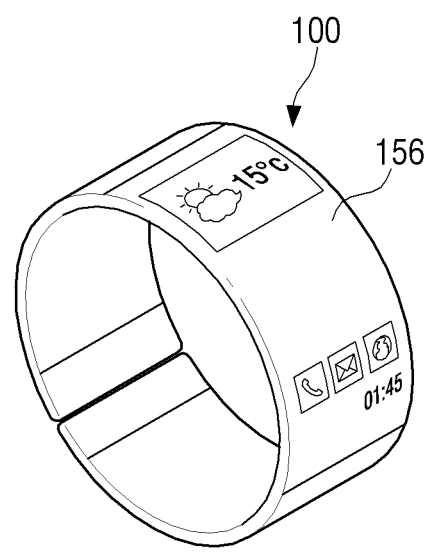
FIGS. 1A, 1B and 1C illustrates devices configured to perform a communication service according to an exemplary embodiment.

Certain exemplary embodiments of the present inventive concept will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the invention with unnecessary detail.

The expression such as "unit" or "module" refers to a basic unit configured to process one function or operation, which may be implemented in a form of hardware or software, or a combination of hardware and software.

Throughout the description, a 'device configured to perform communication service' may be a mobile terminal. For example, the device configured to perform communication service may be a mobile phone, a smart phone, a laptop computer, a tablet PC, an e-book terminal, a digital broadcast terminal, a personal digital assistant (PDA), a portable multimedia player (PMP), a GPS, a wearable PC, or a wrist-watch phone, but is not limited thereto.

The concepts of the device configured to perform communication service and communication services according to an exemplary embodiment will be explained below with reference to FIGS. 1 to 3.

A system configured to perform a communication service according to an exemplary embodiment includes two or more devices. By way of example, the two or more devices may include a first device 100 and a second device 200. The first and second devices 100, 200 may acquire motion and recognize gesture from the acquired motion. To 'acquire motion' as used herein may encompass acquiring information about motion or posture of a part of a user's body or a device. The information about the motion or posture may include information as detected from a sensor of a corresponding device, or information received from an external device such as accessory.

In one exemplary embodiment, the gesture may include a motion or posture pattern of a part of a user's body or device.

In one exemplary embodiment, the gesture may be a motion or posture pattern of a part of user's body or a device. The gesture may be a preset motion or posture for use as an input to a device. For example, the gesture may include a motion or posture of user's finger, hand, arm, toe, foot, head, neck, or waist. The gesture may also include motion or posture (or direction) with respect to a corresponding device which is detected at a sensor of the device in response to a user's motion or posture.

In one exemplary embodiment, the gesture may include one sub gesture and a plurality of sub gestures. A device may retain one or more combination with the plurality of sub gestures that belong to a preset gesture group. Further, each combination of two or sub gestures may correspond to an event which is preset in relation to the communication service.

The one or more sub gestures may be generated from one device and may correspond to an input event made with respect to the user interface of the one device. Irrespective of an operation of an external device or adjacent device, the sub gesture may be associated with a user interface of a device from which the corresponding gesture is generated. For example, the sub gesture may correspond to a navigation made with respect to a menu appearing on a display screen of a specific device, or to a user interface such as selection or execution of an item.

The plurality of sub gestures may be generated together to two or more different devices to implement an event associated with the communication service. The event that 'gestures are generated together' may include substantially simultaneous generation of the gestures to different devices; or alternative generation of gestures to different devices sequentially along time. Further, the event that 'gestures are generated together' may refer to a manner that limits following gesture according to the preceding gesture to implement an event; in which a gesture may be generated sequentially in response to a gesture (or event) of a counterpart device.

By way of example, when the first gesture is generated at first time point at the first device 100, and the second gesture is generated at second time point at the second device 200, the first and second gestures may be the preset sub gestures. When the difference between the first and second time points or the difference between the time point of detecting the first motion corresponding to the first gesture and the time point of detecting the second motion corresponding to the second gesture is smaller than a preset time, the communication service may be performed so that the contents designated in the first device 100 may be transmitted to the second device 200, or the content designated in the second device 200 may be transmitted to the first device 100. That is, it may be determined that the sub gestures are generated substantially simultaneously, when the difference between the time points of generating the two gestures or between the time points of detecting the motions corresponding to the two gestures is smaller than a preset time (e.g., 500 m sec).

The combination of two or more sub gestures may correspond to an event preset in association with the communication service. The first and second devices 100, 200 may retain one or more combinations in a memory, respectively. The memory may also store an event corresponding to each combination.

The gestures or the combination of gestures will be explained in the following embodiments.

Throughout the description, it is generally exemplified that the communication service is implemented in accordance with detection of the motion (or posture) of a user's finger, hand or arm or a motion (or posture) of a device in response to the user's motion (or posture).

Further, a mobile terminal such as a bangle type wearable device will be mainly exemplified in explaining a mobile terminal to detect various motions (or postures) of user's finger hand or arm.

In exemplary embodiments where the device is other than a wearable configuration, such as, a smart phone or a tablet PC, gestures may be more limited than with the wearable devices. However, the motion (or posture) of a user with respect to a device he is gripping is still detected and gesture is recognized according to the detected motion.

Further, the device according to an exemplary embodiment may also include a variety of mobile terminal configurations, irrespective of whether the device is suitable for wearing, gripping or moving. For example, the device may recognize motion by receiving information about motion (or posture) from a wearable accessory.

Figure 1B:
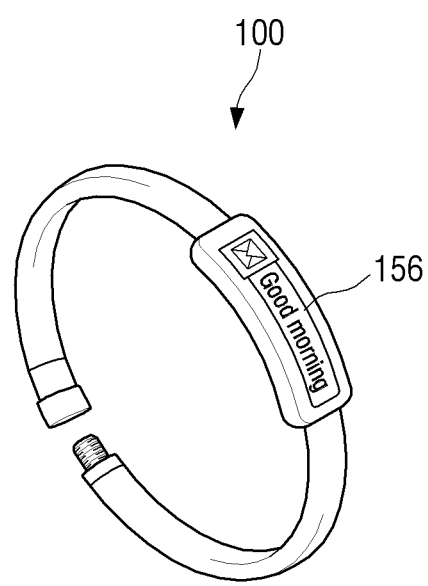
Figure 1C:
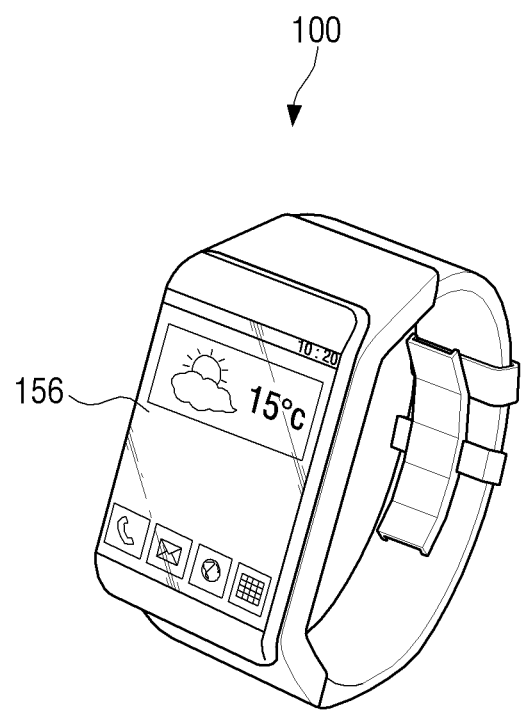

FIGS. 1A, 1B and 1C illustrate devices configured to perform a communication service according to an exemplary embodiment.

It is assumed that a first device 100 is implemented to perform a communication service. It is also assumed that the second device 200 is an identical or similar mobile terminal as the first device 100. For example, the first device 100 may have a band-like configuration similar to the one illustrated in FIG. 1A, a wrist watch-like configuration similar to the one illustrated in FIG. 1C, or a bracelet-like configuration similar to the one illustrated in FIG. 1B. The first device 100 may include a display screen 156. The display screen 156 may be the surface on which information or data is displayed on a display panel included in a display module of the first device 100. Referring to FIG. 1A, the display module of the first device 100 may be a flexible display with a bent display screen 156. Further, the first device 100 illustrated in FIG. 1C may have planar display screen 156. Further, the first device 100 as illustrated in FIG. 1B may have small display screen 156, and the display screen 156 may display a text-type message and main notice information, etc.

The first device 100 may not have the display screen 156. For example, when the display screen 156 is omitted from the first device 100, the first device may provide a user interface using voice recognition or auditory feedback.

Further, the first device may be or may not be a stand-alone device.

Figure 2:
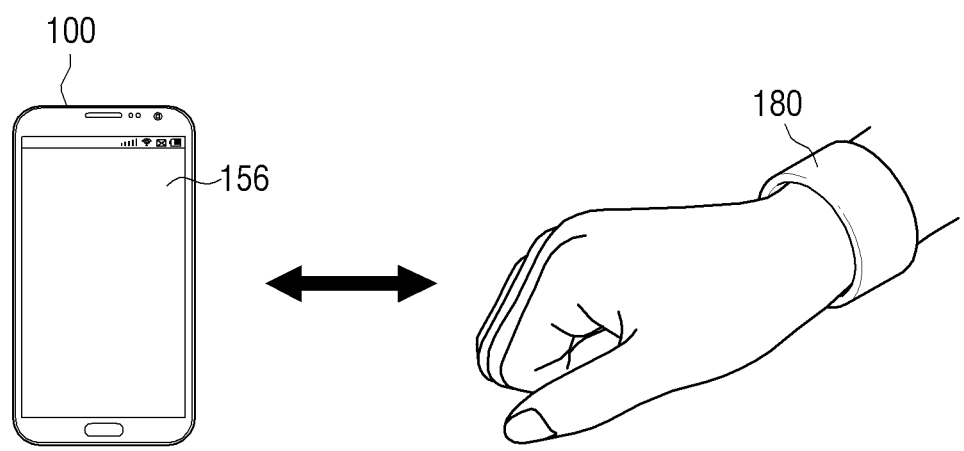
FIG. 2 illustrates a device configured to perform a communication service according to an exemplary embodiment.

FIG. 2 illustrates a device configured to perform a communication service according to an exemplary embodiment.

The first device 100 may be a mobile terminal such as a smart phone or a tablet PC. The first accessory 180 may be a wearable device which is in similar form to the first device 100 illustrated in FIGS. 1A to 1C. Both the first device 100 and first accessory 180 may be connected for communication with each other using at least one of the near distance communication module such as the WiFi, WiFi direct, or Bluetooth. The first accessory 180 may sense the first motion according to a user's motion (or posture). The first accessory 180 may transmit information about the first motion to the first device 100. The first device 100 may recognize a preset gesture based on the first motion acquired from the first accessory 180.

When the recognized gesture is an sub gesture, the first device 100 may control so that a control event or an input event of a user interface of the first device 100 corresponding to the recognized gesture is processed.

Further, when the recognized gesture is a sub gesture belonging to a preset gesture group, the first device 100 may perform communication service with an adjacent device based on the recognized gesture. Further, the first device 100 may transmit feedback information as a result of performing communication service or information about user-inputted request to the first accessory 180. Further, the first accessory 180 may provide the user with visual, auditory or tactile feedback using a display screen, speaker or actuator.

Figure 3A:
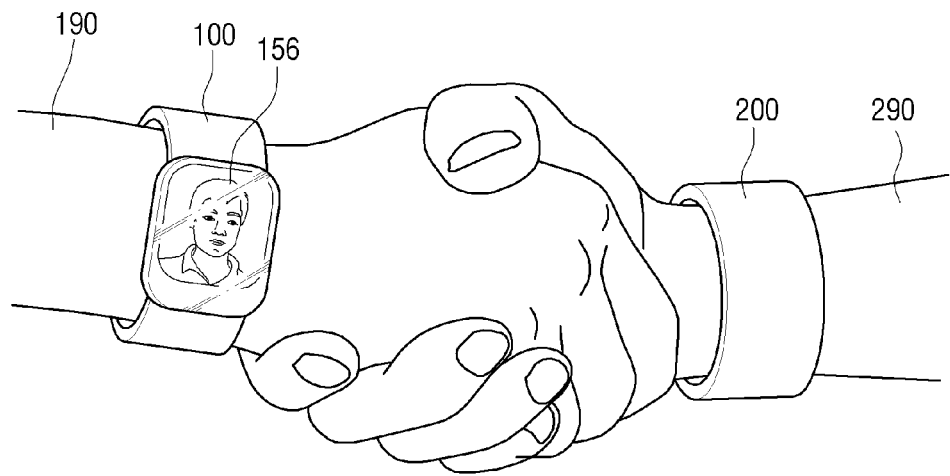
FIGS. 3A and 3B illustrate a concept of a communication service performed among devices according to an exemplary embodiment.
Figure 3B:
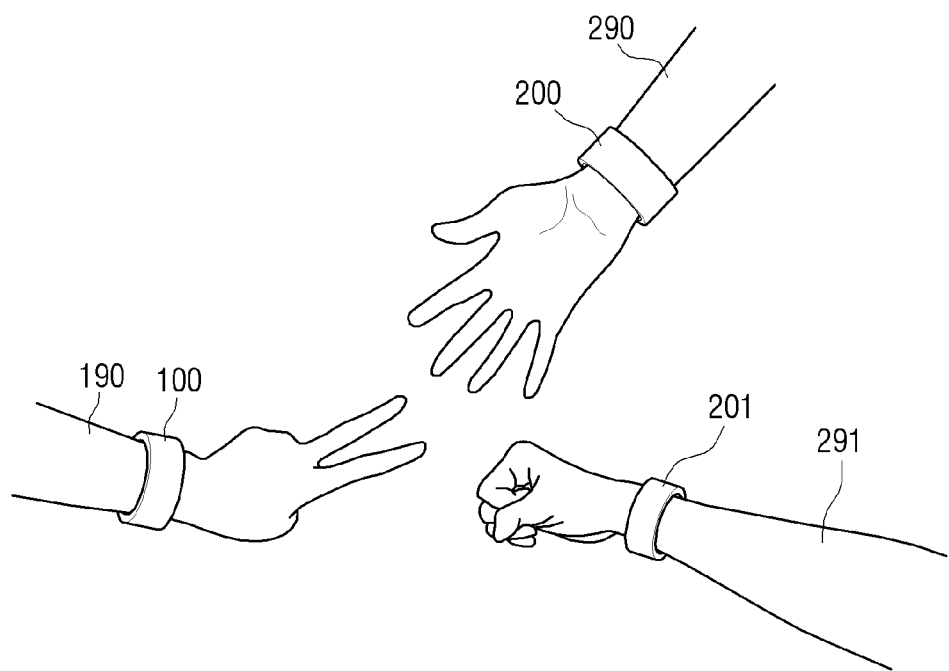

FIGS. 3A and 3B illustrate concepts of communication service performed among the devices, according to an embodiment.

Referring to FIG. 3A, a first user 190 may wear the first device 100 on his wrist, and a second user 290 may wear the second device 200 on his wrist. It is assumed that the first device 100 and the second device 200 may be formed with communication links of different WiFi direct manners. The first device 100 and second device 200 may store the gestures belonging to preset gesture group. In response to a motion (i.e., handshake) between the first user 190 and second user 290, the first device 100 senses the first motion, and the second device 200 may detect the second motion substantially simultaneously. When the first motion corresponds to the first gesture belonging of the preset gesture group, the first device 100 may wirelessly search for a service set identifier (SSDI) to form a communication link with adjacent devices. Further, when the second motion corresponds to the second gesture belonging to the preset gesture group, the second device 200 may wirelessly search for a SSID.

Besides the general identifier pattern as used, for example, for an Internet router, the SSID may use or combine a preset value. When a separate SSID is used, a device that receives the SSID may know that a connection to other devices, or a preparation process for the communication service according to an exemplary embodiment is necessary.

Additionally, a device that advertises a SSID may use a general SSID, and notify the adjacent devices about a communication service identifier corresponding to the generated gesture or an event such as a required communication process, using a header or payload of the advertise packet.

When an SSID is not found among the adjacent devices, a searching device may arbitrarily play a role of a master, and accordingly, may advertise an SSID so that the other adjacent devices participate in the communication connecting process as slaves. The device acting as a master may determine an SSID advertising time by random back-off, and continue searching for an SSID immediately before the SSID advertising, thereby preventing collision that may occur when the adjacent devices advertise SSID together. It is assumed that the first device 100 operates as a Wi-Fi direct type master.

Accordingly, the first device 100, acting as a master, and the second device 200, acting as a slave, may form a communication link. The communication connecting process including the operation of transmitting an SSID may be omitted, when the communication link is already formed between the first device 100 and the second device 200 before the detection of the first and second motions.

The second device 200 may transmit information about the second motion to the first device 100 via the communication link. The information about the second motion may include data detected at a sensor of the second device 200 representing the second motion, or representing the second gesture corresponding to the second motion. Further, the information about the second motion may include information about the time point of detecting the second motion, or the time point of generating the second gesture.

The first device 100, in receiving the information about the second motion, may determine whether or not the second motion meets the condition for executing the communication service, i.e., whether or not the second motion corresponds to the second gesture belonging to the preset gesture group. Further, the first device 100 may determine whether the conditions are met, i.e., whether the difference between the time points of detecting the first and second motions is smaller than a preset time. When the conditions are met, the first device 100 may transmit a condition match response message to the second device 200.

Further, the first device 100 and the second device 200 may perform an event that corresponds to a combination of the first and second gestures. By way of example, the event may be an exchange of designated data of the respective devices, in which case the display screen 156 of the first device 100 may display business card information of the second user 290 received from the second device 200. Further, the display screen (not illustrated) of the second device 200 may display business card information of the first user 190 received from the first device 100.

Referring to FIG. 3B, there are first device 100 used by first user 190, second device 200 used by second user 290, and third device 201 used by third user 291. The devices may each store therein preset gesture groups including rock, paper, scissors. As explained above with reference to FIG. 3A, the communication connecting process may be performed among the device as one device arbitrarily plays a role of a master to thus advertise an SSID, and the other devices adjacent to the arbitrary master play a role of slaves to thus receive the SSID. The master device may receive information on the motions from the connected slave devices. When the motion corresponds to a gesture belonging to the preset gesture group, the master device may transmit the condition match reply message to the slave devices to execute an event that corresponds to the combination of gestures.

By way of example, according to the rule of rock-paper-scissors game, the devices 1, 2, 3 (100, 200, 201) may automatically provide feedback to the user that the game ends in a draw. Further, when the rock gesture is generated at a first device 100, and a paper gesture is generated at the second device 200 and third device 201, the first device 100 may display information about winning the game, while the second device 200 and third device 201 may send feedback with information about losing the game.

As explained above, the communication service according to an exemplary embodiment may include a service to transmit or exchange designated data, control information or contents using communication link of wireless communication manner among devices, an educational service, an entertainment service or a social network service that enables two or more user to participate.

Figure 4:
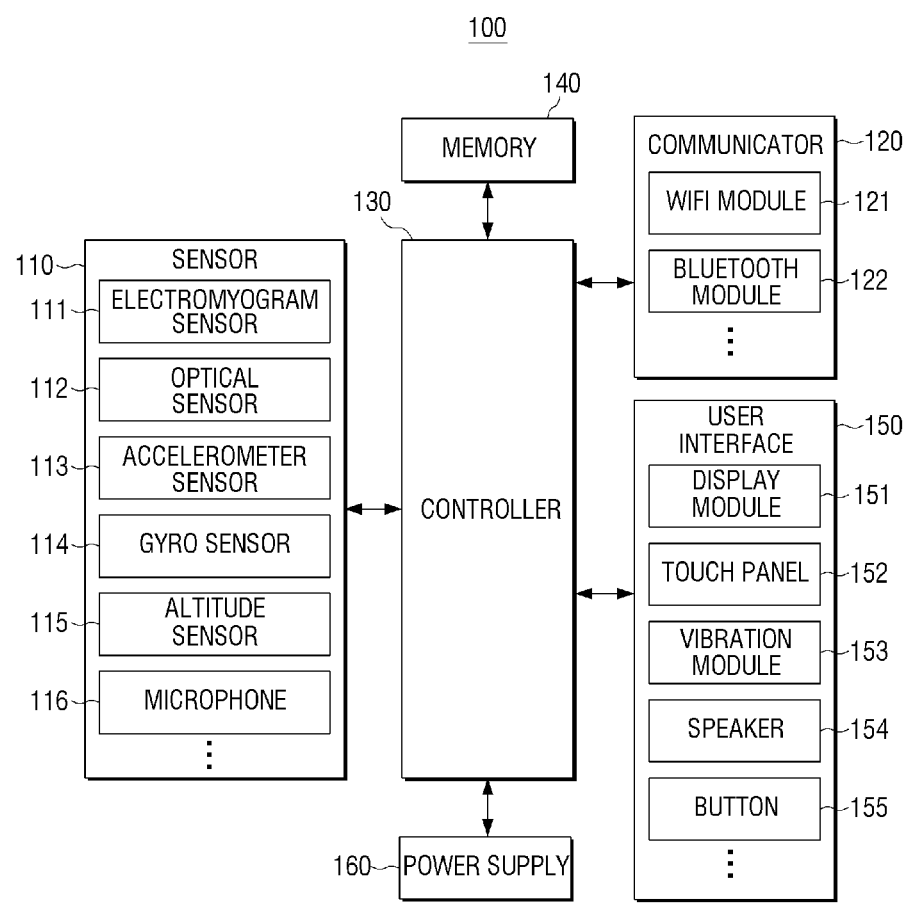
FIG. 4 illustrates a device configured to perform a communication service according to an exemplary embodiment.

FIG. 4 illustrates a device configured to perform a communication service according to an exemplary embodiment.

In one exemplary embodiment, the first device 100 may include a sensor 110, a communicator 120 and a controller 130. That is, the first device 100 may include the sensor 110 which senses the first motion, the communicator 120 which receives information about a second motion from the second device 200 located adjacent thereto, when the first motion corresponds to a first gesture belonging to a preset gesture group, and the controller 130 which controls so that an event corresponding to a combination of the first and second gestures is executed, when the received information corresponds to the second gesture belonging to the preset gesture group.

The first device 100 may additionally include a memory 140. Further, the first device 100 may additionally include a user interface 150 and a power supply 160.

In another exemplary embodiment, the first device 100 may include a memory 140 which stores a preset gesture group including a plurality of gestures corresponding to sequential events, a sensor 110 which senses motions, a controller 130 which controls so that a first event of transmitting an information request to the second device 200 located adjacent to the first device 100 is performed, when recognizing the first gesture that corresponds to a first event from the detected motion among a plurality of gestures, and a communicator 120 which performs a second event of receiving reply information transmitted from the second device 200, when the second gesture corresponding to the second event following the first event is generated from the second device 200 among the plurality of gestures.

The second device 200 or a device performing communication service with the first device 100 may have identical or similar mechanical constitution as the first device 100. Although not specifically illustrated, it is assumed that the second device 200 may have the identical block diagram as the first device 100. Accordingly, referring to FIG. 4, the function blocks of the second device 200 will be given the same reference numerals as those of FIG. 4, but with the first digit increased from '1' to '2'. Accordingly, the second device 200 includes a sensor 210, a communicator 220 and a controller 230.

For example, the second device 200 may include the sensor 210 which senses the second motion, the communicator 220 which transmits information about the second motion to the first device 100 located adjacent to the second device 200, when the second motion corresponds to the second gesture belonging to the preset gesture group, and the controller 230 which controls so that an event corresponding to a combination of the first and second gestures is executed, when detecting the first motion corresponding to the first gesture belonging to the preset gesture group at the first device 100 within a preset time before or after the time point of detecting the second motion. The second device 200 may also include a memory 240, a user interface 250, or a power supply 260.

Hereinbelow, the function blocks of the second device 200 will be explained, while the function blocks overlapping with the first device 100 will not be redundantly explained for the sake of brevity.

The sensor 110 of the first device 100 senses the first motion with respect to the first device 100 in accordance with the first user or the motion of the first user. For example, the sensed first motion may be first shape information (e.g. shape of hand or finger) of part of body of the first user, first acceleration information with respect to the first device 100, or the first direction information representing direction of motion of the first device 100.

The sensor 100 may include a myogram sensor 111, an optical sensor 112, an acceleration sensor 113 or a gyro sensor 114. Further, the sensor 110 may include an altitude sensor 115 or a microphone 116. The first shape information may be sensed via at least one of the optical sensor 112 and the myogram sensor 111.

Figure 5A:
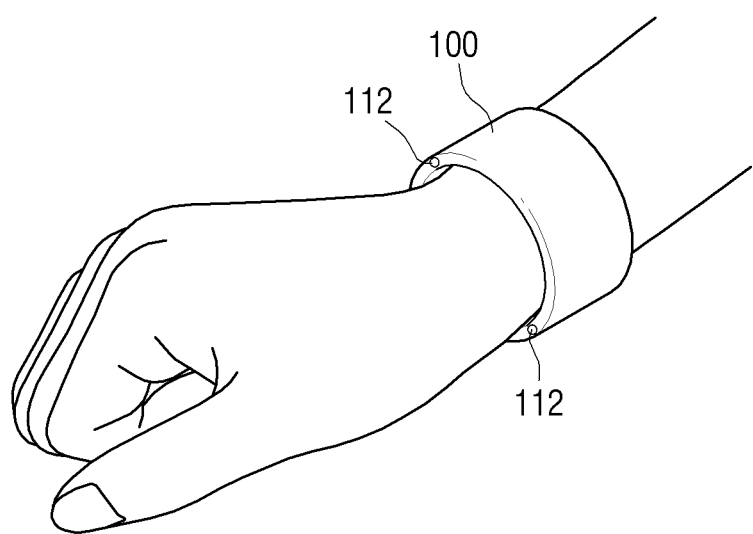
FIGS. 5A and 5B are views provided to explain an optical sensor of a device configured to perform a communication service according to an exemplary embodiment.
Figure 5B:
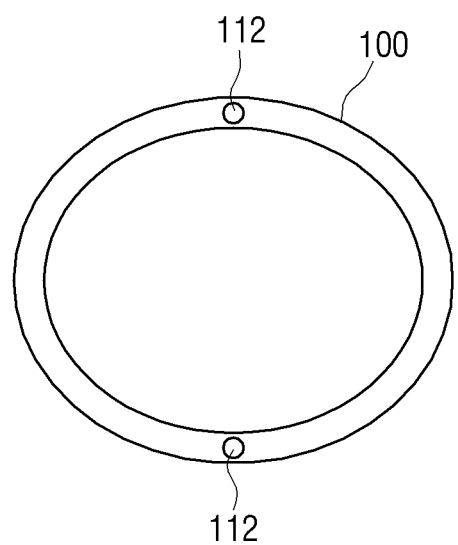

Referring to FIGS. 5A and 5B, the first device 100 may be equipped with one or more optical sensors 112. FIG. 5A illustrates the first device 100 worn on a user's wrist, and FIG. 5B illustrates the first device 100 equipped with the optical sensor 112 arranged on one side. To allow easy photographing of a hand, the location or number of the optical sensors 112 may be appropriately adjusted according to manufacturer's design. For example, a camera may be mounted on side of the first device 100 to face the user's hand.

The optical sensor 112 may use a 2D or 3D camera, or infrared camera as a depth sensor. For example, the optical sensor 112 located on one side of the first device 100 may photograph a hand or finger over a period of time and acquire image data. The controller 130 may detect the first shape information from the image data.

Figure 6A:
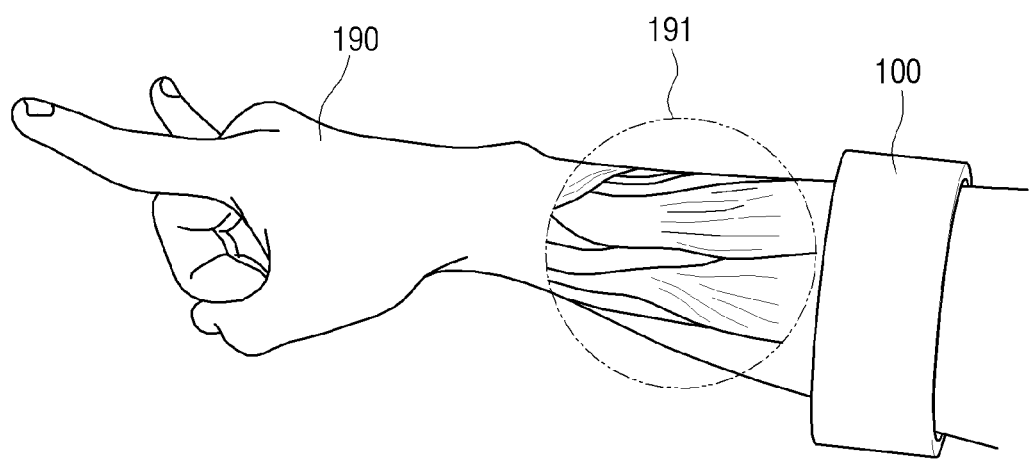
FIGS. 6A and 6B are views provided to explain a myogram sensor of a device configured to perform a communication service according to an exemplary embodiment.
Figure 6B:
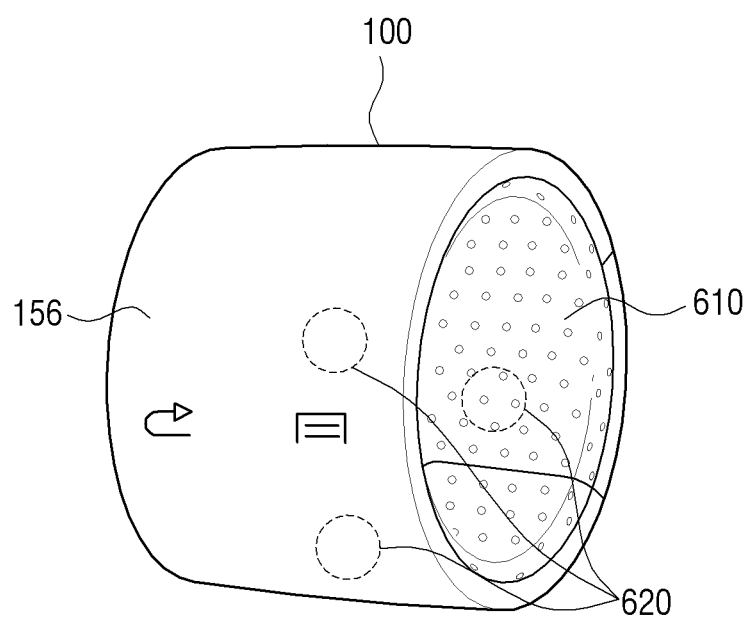

Referring also to FIGS. 6A and 6B, the sensor 110 may include an electromyogram sensor 111. The electromyogram sensor 111 may measure biological electric signal accompanying muscle activity through electrodes attached near the muscles. The electrodes 620 of the electromyogram sensor 111 may be arranged in an array form near the skin of the first user. Depending on manufacturer's design, the electrodes 620 may be exposed to outside, and the number of myogram signal channels or electrodes 620 may be varied in consideration of the accuracy of myogram measurement. Further, the surface 610 of the first device 100 that contacts the body of the first user or the housing or tools of the first device 100 may be designed in consideration of an accurate measurement of the myogram and wearability. For example, an elastic substance such as air cushion may be formed below the surface 610 to allow closer contact with the hand, wrist or arm. Further, the housing or tools of the first device 100 may be so designed as to be wrapped around the body of the first user. Further, an air pump type housing or tool may be designed to allow the electrodes 620 on the surface 610 to be contacted to the user's body more closely.

As the muscle 191 moves according to the shape of the hand of the first user, the electromyogram sensor 111 may measure the variations of the intensity of the myogram over a period of time. The controller 130 may estimate the shape of the hand using the statistics based on the database measured in advance from the information on the variations of the myogram intensity, machine learning or heuristic algorithms.

Figure 7:
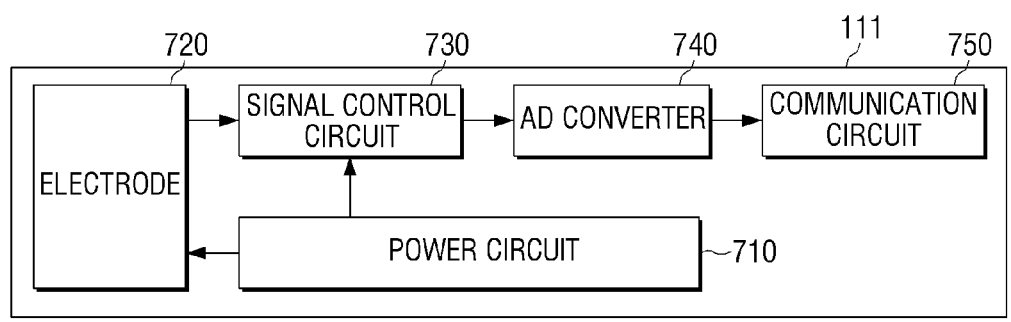
FIG. 7 illustrates a myogram sensor according to an exemplary embodiment.

Referring to FIG. 7, the electromyogram sensor 111 may include an electrode 720, a signal control circuit 730, an analog to digital (AD) converter 740, or a communication circuit 750. Further, the electromyogram sensor 111 may additionally include a power circuit 710 to supply power to the electrode 720 or the signal control circuit. The electrode 720 may include electrodes 620 including a measure electrode, a reference electrode, or a ground electrode. When the power or signal is applied to the electrodes, the potential difference formed between the measure electrode and the reference electrode may be amplified at the signal control circuit 730. The signal control circuit 730 may include a filter, or an amplifier to remove noise from the signal. The AD converter 740 may convert the amplified analog signal into digital, and the communication circuit 750 may transmit the converted myogram signal to the controller 130 or transmit to the memory 140 so that the myogram signals measured over the recent predetermined duration of time are buffered or stored.

Figure 8A:
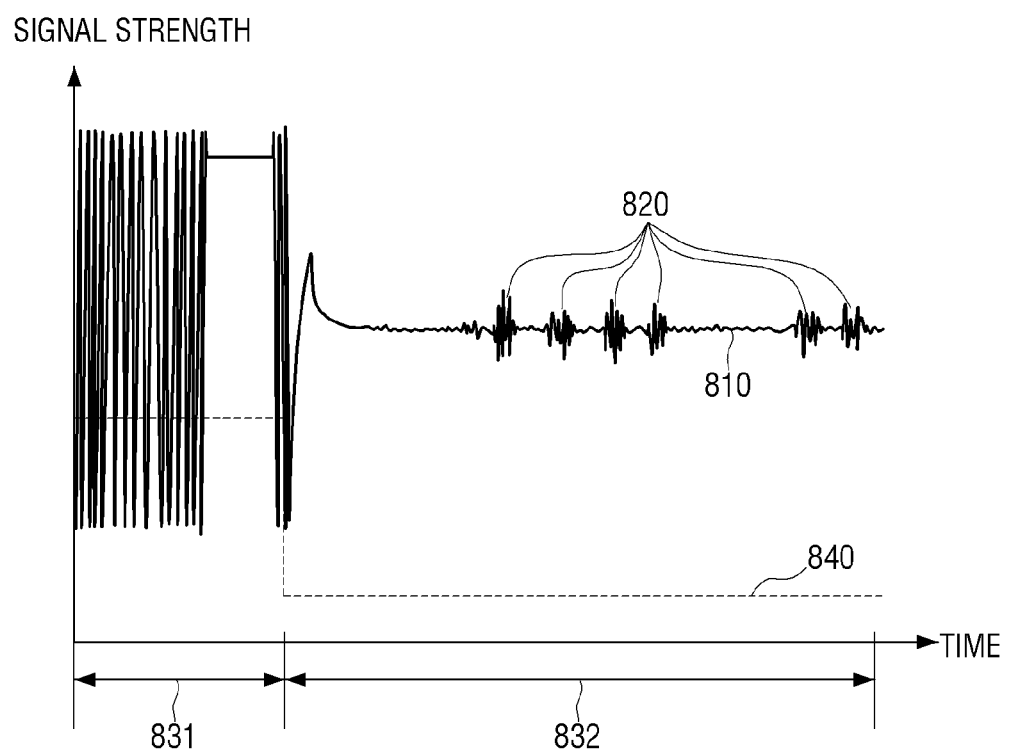
FIGS. 8A and 8B illustrate a myogram sensor signal detected at a myogram sensor according to an exemplary embodiment.
Figure 8B:
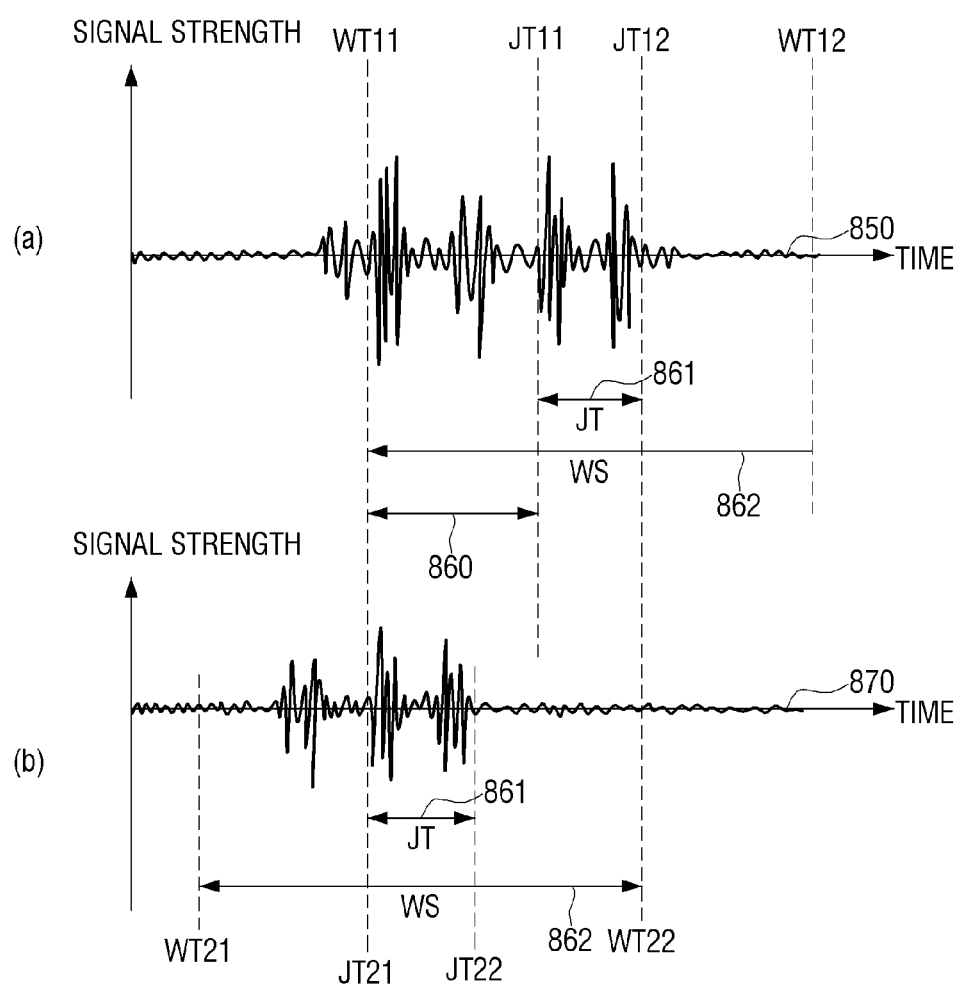

FIGS. 8A and 8B illustrate a myogram signal detected at an electromyogram sensor according to an exemplary embodiment. Referring to FIG. 8A, the myogram signal 810 in the time interval 831 is measured when the user does not wear the first device 100 on him, while the myogram signal 810 in the time interval 832 is measured when the user wears the first device 100 on him. A sub-signal 840 indicates whether the first device 100 is worn on the user and the myogram signal 810 is normally received. Depending on implementation, only the myogram signal 810 may be detected, while the sub-signal 840 is omitted.

Referring to FIG. 8B, the myogram signal 850 at (a) is the one that is detected at the first device 100, while the myogram signal 870 at (b) is the one that is detected at the second device 200. For example, as explained above with reference to FIG. 3A, the memory 140 may store a preset gesture group that includes handshake gestures. As the first user and the second user shake hands and the hands move, the first device 100 senses the myogram signal 850, and the second device 200 senses the myogram signal 870. The controller 130 of the first device 100 may distinguish the first gesture about the handshake, based on the myogram signal 850 applied for the duration of gesture time 861 between JT11 and JT12.

Further, the memory 240 of the second device 200 may store a preset gesture group that includes handshake gestures. The controller 230 may distinguish the second gesture about the handshake, from the myogram signal 870 applied during the gesture time 861 between JT21 and JT22.

The time interval between WT11 and WT12 and the time interval between WT21 and WT22 represent the window size 862 for observing motions for the purpose of identifying gestures, or for comparing the motions corresponding to the gestures generated at two or more devices. The window size 862 may be set in consideration of a preset gesture time 861 corresponding to a gesture and preset time. The preset time represents a reference size to the difference between time points of generating gestures at different devices or time points of detecting motions corresponding to the gestures.

For example, the second motion information transmitted from the second device 200 to the first device 100 may include data about the myogram signal 870 that corresponds to the window size 862 between WT21 and WT22. Further, the second motion information may be the myogram signal 870 corresponding to the gesture time 862. The time point of generating gestures or the time points of detecting motions may also be transmitted.

The condition for performing an event corresponding to a combination of the first gesture generated at the first device 100 and the second gesture generated at the second device 200 may include a condition that the difference between the time point of detecting the first motion corresponding to the first gesture and the time point of detecting the second motion corresponding to the second gesture has to be smaller than a preset time. Referring to FIG. 8B-(a), the time point of detecting the first motion may be designated to be a motion starting time JT11, ending time JT12 or average time (JT11+JT12)/2. For example, the difference between the time points of detecting the two motions may be a time difference 860 between JT11 and JT21 and when the time difference 860 between JT11 and JT21 is smaller than a preset time, it may be determined that the condition for performing the event is met. Further, as the condition for performing an event corresponding to a combination of the gestures associated with the user's handshake, the controller 130 may determine whether or not the myogram signal 870 in the time interval between WT21 and WT22 received from the second device 200 includes the signal in the similar pattern as the myogram signal 850 corresponding to the gesture time 861 between JT11 and JT12. For example, the controller 130 may calculate correlativity between the myogram signals 850, 870 for the duration of the gesture time 861 or the window size 862, and determine that the gestures are substantially identical when the correlativity exceeds a preset value.

The sensor 110 may include an acceleration sensor 113 or a gyro sensor 114. The acceleration sensor 113 or the gyro sensor 114 may sense the first acceleration information about the first device 100, or the first direction information that represents a direction where the first device 100 is moving.

Further, the sensor 110 may include at least one of the electromyogram sensor 111, the optical sensor 112, the acceleration sensor 113 and the gyro sensor 114. Further, the sensor 210 of the second device 200 may function in the same manner as the sensor 110 of the first device 100. Further, the second motion information may be the shape information, acceleration information or direction information that is transmitted from the second device 200 to the first device 100 for the duration of the window size or the gesture time corresponding to the respective information.

Further, the sensor 120 may include a piezoelectric sensor (not illustrated) or an acoustic wave measuring module (not illustrated). The piezoelectric sensor or the acoustic wave measuring module may sense motion of a body, tap or impact on a body to acquire motion or gesture.

Further, the sensor 110 may include an altitude sensor 115. The altitude sensor 115 may measure altitude based on atmospheric pressure or determine relative height of a plurality of devices. Accordingly, the motion information may additionally include height information.

Further, the sensor 110 may include a microphone 116 to convert acoustic wave such as voice or sound into electric signal. Further, the microphone 116 may be included in an acoustic communication module (not illustrated) along with a speaker 154 to the user interface 150 to be used in the acoustic wave communication signal transmission and reception.

The controller 130 may receive from one or more sensors included in the sensor 130 the first motion information including the first shape information, the acceleration information or the first direction information. The controller 130 may recognize the first gesture that corresponds to the first motion, from the first motion information. The controller 230 of the second device 200 may also receive the second motion information and perceive the second gesture.

Further, the second motion information transmitted from the second device 200 to the first device 100 may include information about the second gesture that corresponds to the second motion. At this time, the information about the second gesture may be one of the identifiers that are given to the gestures belonging to the preset gesture group. For example, the controller 230 of the second device 200 may recognize the second gesture from the second motion and may perform a control operation so that the identifier of the second gesture is transmitted to the first device 100 as the second motion information. The controller 130 of the first device 100 in receipt of the information about the second gesture determines whether or not the second gesture belongs to the preset gesture group, and determines whether the time difference between the time point of generating first gesture at the first device 100 and the time point of generating the second gesture at the second device 200 (or difference between time points of detecting the motions corresponding to the respective gestures) is smaller than a preset time or not. When the above-mentioned determination conditions are met, the controller 130 may control so that the communication service is performed with the second device 200.

Further, the controller may perform a control operation so that the information about the motion such as the shape information, acceleration information or direction information that is measured for a predetermined recent time period, is stored in the memory 140 as the log data. For example, the memory 140 may temporarily store the log data that corresponds to the window size. Further, the memory 140 may continuously accumulate the log data for longer than a predetermined time period. The accumulated log data may be used for extracting a use pattern of a corresponding user and providing service that suits the circumstances, or is used for the machine learning to thereby identify the gesture from the motion that suits the user's intention.

Further, the sensor 130 may include a microphone 116. The microphone 116 may operate in response to an input to the user interface, recognition of user voice or in call operation.

When the first motion corresponds to the first gesture that belongs to the preset gesture group, the communicator 120 of the first device 100 receives the second motion information from the second device 200 located adjacent to the first device 100.

Further, when the second motion corresponds to the second gesture that belongs to the preset gesture group, the communicator 220 of the second device 200 transmits the second motion information to the first device 100 that is located adjacent to the second device 200.

The communicator 120 may include a WiFi module 121 or a Bluetooth module 122. The Bluetooth module 122 may operate in Bluetooth low energy (BLE) communication manner, or Bluetooth classic communication manner. The WiFi module 121 may be IEEE 802.11 communication standard-based communication module, which may operate as an access point or form near distance wireless LAN by accessing the access point. The WiFi module 121 may include WiFi direct method. Further, for operation in communication among devices, the WiFi module 121 may include a manner in which one device operates as a master and the others operate as slaves, and a manner in which the devices negotiate to operate equally in terms of connecting procedure or abilities.

Further, the communicator 120 may include a near distance communication manner such as Zigbee, infrared data association (IrDA), RF-ID or near field communication (NFC). Further, the communicator 120 may include a sound wave communication module (not illustrated). The sound wave communication module may use a speaker, a microphone, a sound circuit or a processor, and may transmit or receive sound wave signal using a sound frequency band signal.

Further, the communicator 120 may include not only the near distance communication module, but also wireless communication module. The wireless communication module may include communication module based on standard such as Global System for Mobile Communications (GSM), Wideband Code Division Multiple Access (WCDMA), High-Speed Downlink Pack Access (HSDPA), TE or Worldwide Interoperability for Microwave Access (WiMAX) using technology such as Time-division multiplexing (TDM), Time division multiple access (TDMA), Frequency-division multiplexing (FDM), Frequency Division Multiple Access (FDMA), Code Division Multiplexing (CDM), Code Division Multiple Access (CDMA), Orthogonal Frequency-Division Multiplexing (OFDM), Orthogonal Frequency-Division Multiple Access (OFDMA), Multiple-Input and Multiple-Output (MIND), or smart antenna.

The controller 130 of the first device 100 may control so that an event corresponding to a combination of the first and second gestures is performed, when the received information corresponds to the second gesture that belongs to the preset gesture group.

Further, when the first motion corresponding to the first gesture that belongs to the preset gesture group is detected at the first device 100 within a preset time before or after the second motion detection, the controller 230 of the second device 200 may perform a control operation so that an event corresponding to the combination of the first and second gestures is performed.

The controller 130 may include a central processing unit (CPU), a read-only memory (ROM) storing therein a control program to control the first device 100, and a random access memory (RAM) configured to memorize a signal or data inputted from outside the first device 100, or for use as a memory area for the operation performed at the first device 100. The CPU may include not only a single core, but also a multi core such as a dual core, a quad core, or an octa core. The CPU, ROM and RAM may be connected to each other via internal bus, or implemented in the form of a chip or a module.

The memory 140 stores a preset gesture group. Further, before the detection of the first motion, the memory 140 may retain one or more combinations of a plurality of gestures including the first and second gestures that belong to the preset gesture group. The one or more combinations may each include sub gestures that are generated at two or more difference devices, and a corresponding event may be performed when the sub gestures are generated together. Further, the memory 140 may retain, separately from the one or more combinations, one or more independent gestures that are generated at one device and that corresponds to an input event with respect to a user interface of the one or more devices.

Further, the memory 140 may store a preset gesture group that includes a plurality of gestures corresponding to sequential events.

The memory 240 of the second device 200 may store the preset gesture group, like the memory 140 of the first device 100.

The memory 140 may store a signal or data that is inputted or outputted according to the operation of the sensor 110, the communicator 120 or the user interface 150 under control of the controller 130. Further, the memory 140 may store a control program and applications for the controlling of the first device 100 or the controller 130.

The memory 140 may include a ROM, a RAM or a memory card (e.g., second device 200 card, memory stick) mounted to the first device 100. The memory 140 may include a non-volatile memory, a volatile memory, a hard disk drive (HDD) or a solid state drive (SSD).

In addition to the applications that perform or provide a communication service, the memory 140 may also store images, user information, documents, database or data associated with how to process touch input, background images (menus screen, standby screen) necessary to drive the first device 100 or operating programs, or data acquired from the sensor 110.

Further, the memory 140 may include a medium readable by a machine (e.g., computer). The memory 140 may access information from the machine-readable medium under control of the controller 130 and store the accessed information. The machine-readable medium may be a certain type of medium that provides data to a machine so that the machine performs a specific function. For example, the machine-readable medium may be a storage medium. The machine-readable medium may include at least one of floppy disk, flexible disk, hard disk, magnetic tape, compact disc read-only memory (CD-ROM), optical disc, punch card, paper tape, RAM, programmable read-only memory (PROM), erasable PROM (EPROM), and FLASH-EPROM, but not limited thereto.

The user interface 150 may include a display module 151, a touch panel 152, a vibration module 153, a speaker 154, or a button 155.

The display module 151 may include at least one of a liquid crystal display (LCD), a thin film transistor-liquid crystal display, an organic light-emitting diode, a flexible display, a 3D display, and an electrophoretic display, but is not limited thereto.

The touch panel 152 may be implemented in resistive method, capacitive method, electromagnetic induction method, electronic magnetic resonance (EMR) method, infrared method or acoustic wave method.

The display module 151 and the touch panel 152 may operate in combination as a touch screen. The user interface 150 may additionally include a touch screen controller. The touch screen may receive at least one touch by a user's body (e.g., finger including thumb) or touchable input unit. Further, the touch screen may include a pen recognition panel that can recognize input with a pen such as a stylus pen or an electronic pen. Further, the touch screen may be configured so that a panel that detects finger input or input via the input unit based on variations in the induced electromotive force (EMF), a display panel, and a panel that detects touch by a finger on touch screen or input unit based on variations in resistance or capacitance, are in close contact with each other or partially spaced apart from each other while the panels are stacked on each other in sequence. The touch screen controller may convert an analog signal received at the touch screen into a digital signal (e.g., X and Y coordinates) and transmit the same to the controller 130. The controller 130 may control the touch screen using the digital signal received from the touch screen controller. Further, the touch screen controller may be included in the controller 130.

The vibration module 153 may provide the user with tactile feedback such as haptic effect. The vibration module 153 may include a linear motor, a rotary motor or an actuator such as electro active polymer which converts the electric energy according to the haptic signal into kinetic energy.

The speaker 154 may convert an electric energy into a sound signal. The speaker 154 may provide the user with auditory feedback.

The button 155 may receive a button (or key) input from the user to control the first device 100. The button 155 may include a physical button (or key) formed on the first device 100, and a virtual button or a virtual keypad appearing on the touch screen. The physical keypad formed on the first device 100 may be omitted depending on the structure of the first device 100.

The power supply 160 may include one or more batteries (not illustrated) arranged on a housing of the first device 100, a power supply circuit or a battery charge circuit, according to control of the controller 130. The power supply 160 may supply power to the first device 100. Further, the power supply 160 may supply the power, which is inputted from an external power source (not illustrated) via a cable wired to a connector, to the constituent modules of the first device 100 or to the battery. Further, the power supply 160 may supply the power that is wirelessly inputted from an external power source to the constituent modules of the first device 100 or to charge the battery.

Figure 9:
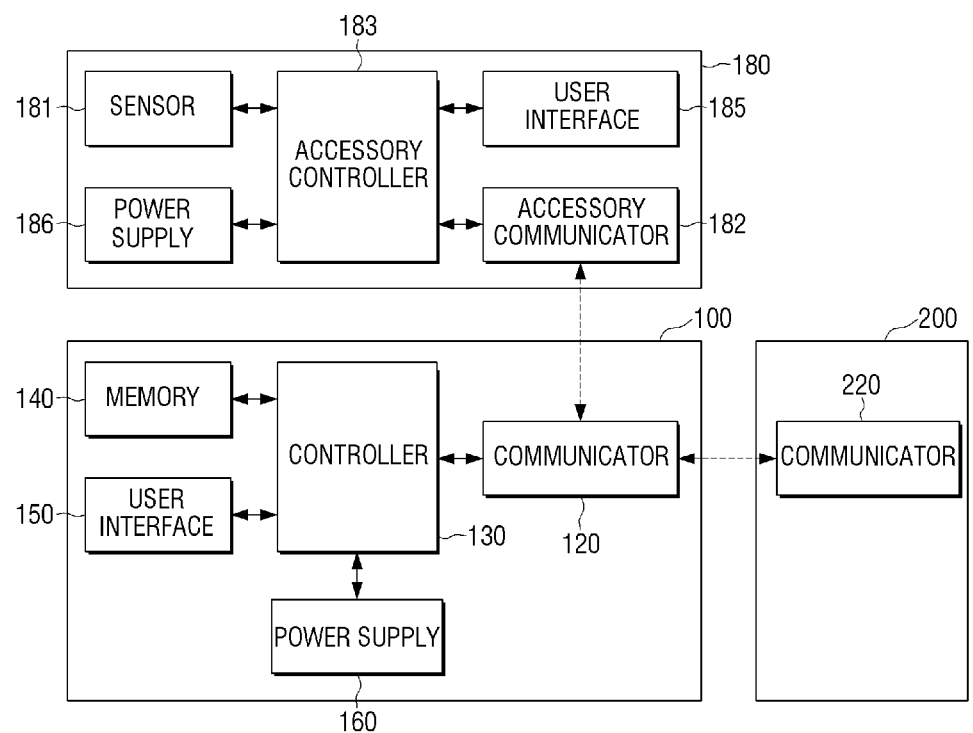
FIG. 9 illustrates a device configured to perform a communication service according to another exemplary embodiment.

FIG. 9 illustrates a device configured to perform communication service according to an exemplary embodiment. The function blocks that are similar to, or that have overlapping operations as those explained above with reference to FIG. 4 will not be redundantly explained below for the sake of brevity.

For example, the first device 100 may include a communicator 120, a controller 130, a memory 140, a user interface 150 or a power supply 160. Based on FIG. 4, the second device 200 may include a communicator 220, a controller 230, a memory 240, a user interface 250 or a power supply 260.

The first accessory 180 may be worn on or gripped by the body of a user of the first device 100. The first accessory 180 may detect the first motion according to the motion (or posture) of the first device 100 or the user of the first device 100.

The first accessory 180 may include a sensor 181, an accessory communicator 182, an accessory controller 183, or a power supply 186. Further, the first accessory 180 may additionally include a user interface.

The sensor 181 may include an electromyogram sensor, an optical sensor, an acceleration sensor or a gyro sensor. The sensor 181 may detect a first motion with respect to the first user or the first accessory according to the motion of the first user. For example, the detected first motion may include first shape information (e.g., shape of hand or finger) of a part of body of the first user, first acceleration information regarding the first accessory, or the first direction information indicating a direction where the first accessory moves.

The accessory controller 183 may control so that the information on the detected first motion is transmitted to the first device 100 based on a preset time interval (e.g., 1 second) or preset event. The 'preset event' may include an event that transmits information about corresponding motion, when the variation of the first motion over time is larger than a predetermined reference. Further, the first accessory 180 may additionally include a memory to store the information about the motion for a predetermined time.

Further, the accessory controller 183 may identify the first gesture from the detected first motion. The accessory controller 183 may control so that the information about the identified first gesture is transmitted to the first device 100. In this case, the first device 100 may not perform the operation of identifying the gesture from the acquired motion.

The accessory communicator 182 may transmit the first motion information to the first device 100 under control of the accessory controller 183. The accessory communicator 182 may include a near distance communication method such as, for example, a WiFi module, a Bluetooth module, a Zigbee, an infrared communication, a RF-ID, an NFC or an acoustic wave communication module. For example, a Bluetooth communication link may be formed between the first accessory and first device 100, while a WiFi direct communication link is formed between the first device 100 and second device 200. The communication method of the communication link may differ from each other, as exemplified above, or may be identical. Further, the communication link may be formed in advance between the first accessory 180 and the first device 100 before the first motion information is transmitted or received.

The communicator 120 of the first device 100 may receive the first motion information that is transmitted from the accessory communicator 182 of the first device 100. The first device 100 may identify the first gesture from the acquired first motion and proceed with the operation to perform the communications service as explained above.

The device to perform communication service may additionally include a second accessory to transmit information about the second motion ('second motion information') to the second device 200. Since the second accessory may be constructed with the same or similar function blocks as those of the first device 100, redundant explanations will be omitted for the sake of brevity.

Further, the first accessory 180 may be provided separately from the first device 100, or the first device 100 may be a set device that includes the first accessory. The second accessory and the second device 200 may have the relationship as explained above.

Figure 10:
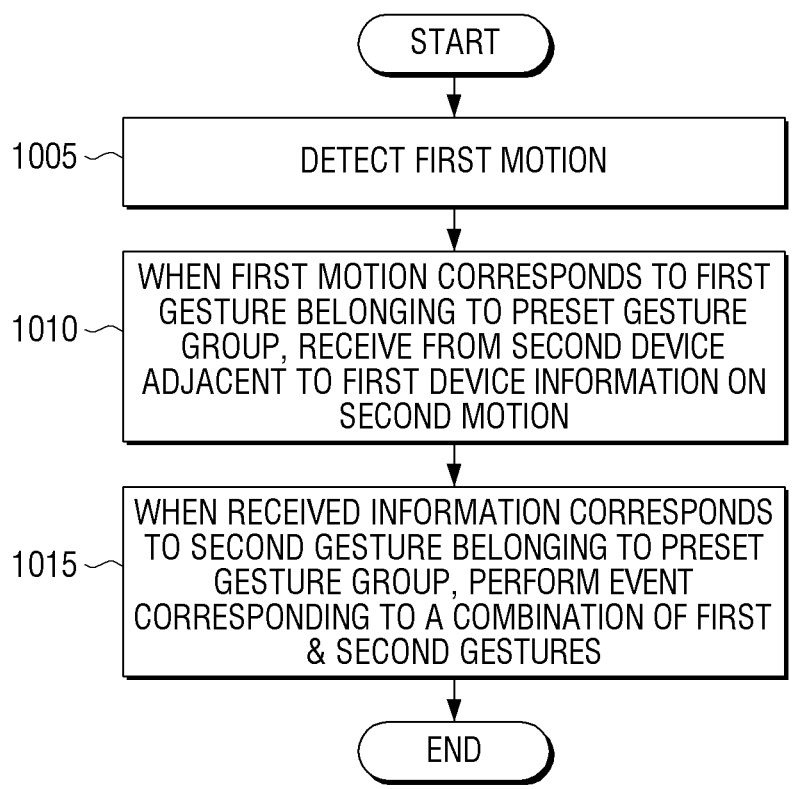
FIG. 10 is a flowchart of a method for performing a communication service at a first device according to an exemplary embodiment.

FIG. 10 is a flowchart of a method for performing communication service at the first device 100, according to an exemplary embodiment.

Before operation S1005, the first device 100 may retain one or more combinations of a plurality of gestures that include the first and second gestures belonging to the preset gesture group, in a memory. The one or more combinations may each include sub gestures that are generated at two or more difference devices, and a corresponding event may be performed when the sub gestures are generated together.

Further, the memory may retain, separately from the one or more combinations, one or more independent gestures that are generated at one device and that corresponds to an input event with respect to a user interface of the one or more devices.

At S1005, the first device 100 may sense the first motion.

The first motion may include at least one of first shape information about a part of the body of the first user of the first device 100, first acceleration information about the first device 100, and first direction information representing direction where the first device 100 moves. That is, the operation of detecting may include detecting at least one of the first shape information of the part of the body of the first user, the first acceleration information with respect to the first device 100, and the first direction information that represents the direction where the first device 100 moves.

At S1010, when the first motion corresponds to the first gesture that belongs to the preset gesture group, the first device 100 may receive information about the second motion ('second motion information') from the second device 200 located adjacent to the first device 100.

Further, before the reception of the second motion information, the first device 100 may perform operation to form communication link with one or more adjacent devices. For example, as explained above with reference to FIGS. 3A and 3B, the first device 100 may wirelessly search SSID and broadcast SSID when failing to find the SSID.

The second motion may include at least one of second shape information of part of body of the second user, second acceleration information with respect to the second device 200, and second direction information that represents the direction where the second device 200 moves. The first and second shape information may each be sensed through the optical sensor or the electromyogram sensor at the first device 100 and the second device 200.

At S1015, when the second motion information received at the first device 100 corresponds to the second gesture that belongs to the preset gesture group, the first device 100 may perform an event that corresponds to a combination of the first and second gestures. Further, the condition for performing the event may include an event when the received second motion information corresponds to the second gesture, and an event when a difference between the time point of detecting the first motion corresponding to the first gesture and the time point of detecting the second motion corresponding to the second gesture, is smaller than a preset time.

Further, the combination of the first and second gestures may include the first and second gestures which are substantially the same. Further, the combination of the first and second gestures may include the first and second gestures with substantially identical trajectory, and opposite directions of motions. The gestures or the combination of gestures will be explained below.

Figure 11:
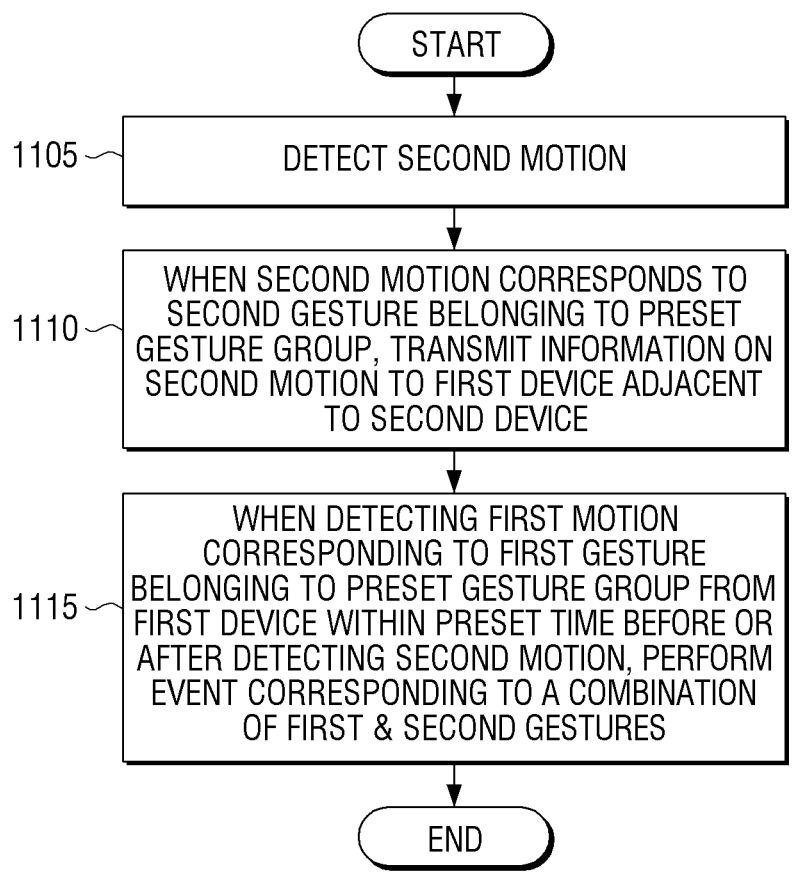
FIG. 11 is a flowchart of a method for performing a communication service between a first device and a second device, according to an exemplary embodiment.

FIG. 11 is a flowchart of a method for performing communication service at the second device 200, according to an exemplary embodiment.

The second device 200 may retain in a memory one or more combinations of a plurality of gestures that include the first and second gestures belonging to the preset gesture group. Further, the second device 200 may additionally retain one or more independent gestures in the memory.

At S1105, the second device 200 may sense the second motion. The second motion may include at least one of the second shape information of a part of a body of the second user of the second device 200, the second acceleration information with respect to the second device 200, and the second direction information that represents a direction where the second device 200 moves.

At S1110, when the second motion corresponds to the second gesture that belongs to the preset gesture group, the second device 200 may transmit the information about the second motion ('second motion information') to the first device 100 located adjacent to the second device 200.

At S1115, when detecting the first motion that corresponds to the first gesture belonging to the preset gesture group at the first device 100 within a preset time before or after the second motion detection, the second device 200 may perform an event that corresponds to the combination of the first and second gestures.

Figure 12:
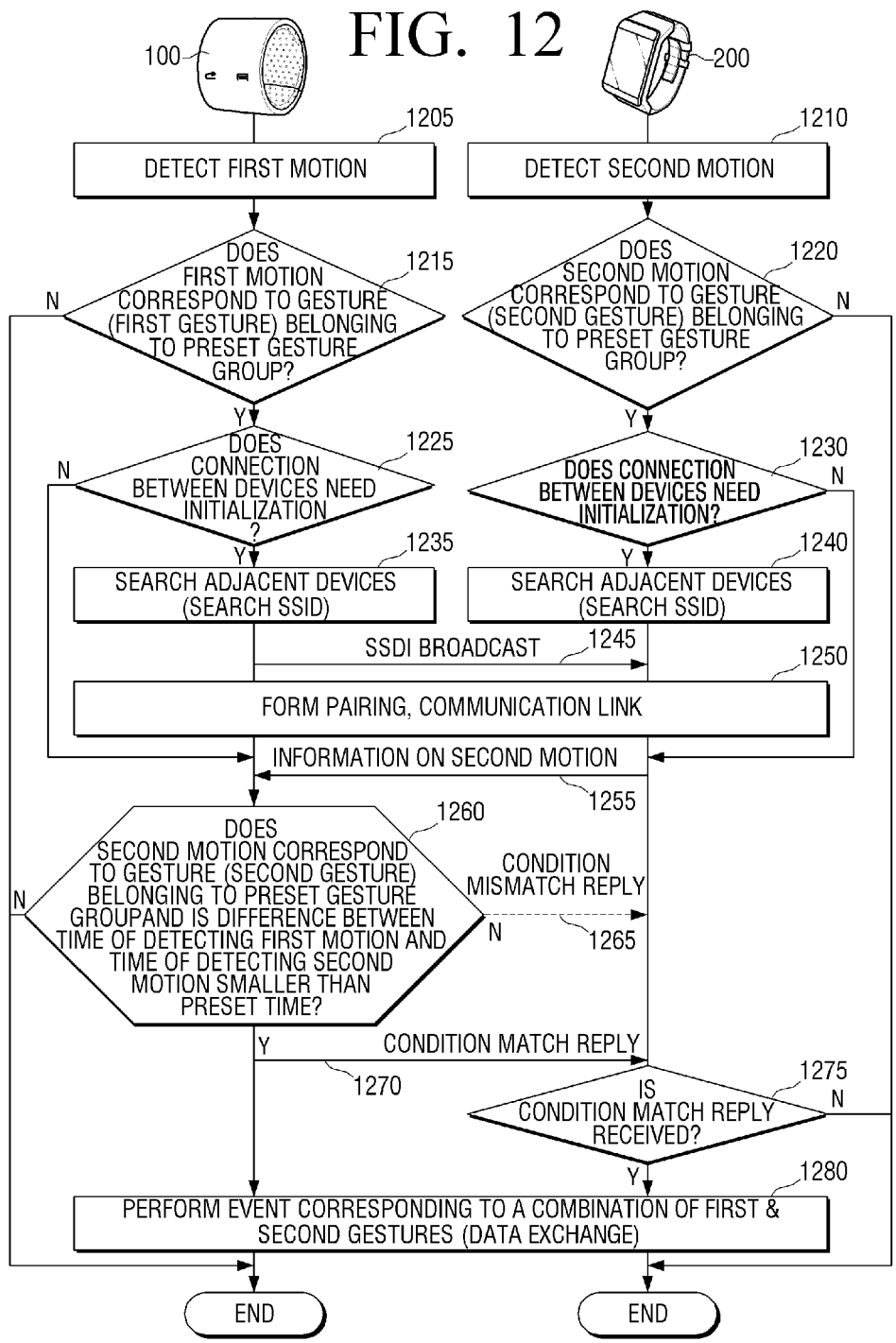
FIG. 12 illustrates a process of a communication service performed between a first device and a second device, according to an exemplary embodiment.

FIG. 12 illustrates a process of performing a communication service between the first device 100 and the second device 200, according to an exemplary embodiment. As explained above with reference to FIG. 3A, it is assumed that the first gesture at the first device 100 and the second gesture at the second device 200 are occurred substantially simultaneously. Further, the event that the 'gestures are occurred substantially simultaneously' may include an event when the time difference between when the first motion corresponding to the first gesture is detected and when the second motion corresponding to the second gesture is detected, is smaller than a preset time.

At S1205, the first device 100 may detect the first motion. Further, at S1210, the second device 200 may detect the second motion.

At S1215, the first device 100 may determine whether or not the first motion corresponds to the gesture (e.g., first gesture) that belongs to the preset gesture group. When the condition at S1215 is not met, the first device 100 may end the process of performing the communication service.

When the condition at S1215 is met, at S1225, the first device 100 may determine whether or not initialization of connection between devices is necessary. For example, the initialization of connection between the devices are not necessary when the communication link is already formed between the first device 100 and one or more adjacent devices (e.g., second device 200), in which case, the first device 100 at S1255 may receive the second motion information from the second device 200 via the communication link.

Further, when the initialization of the connection between the devices is necessary, at S1235, the first device 100 may activate the communicator 120 (e.g., WiFi module 121) and search the adjacent devices. For example, the first device 100 may search the SSID broadcasts from the adjacent devices. When failing to wirelessly find an SSID, at S1245, the first device 100 may play a role of a master and thus broadcast an SSID in a WiFi direct communication manner.

Further, at S1220, the second device 200 may determine whether or not the second motion corresponds to the gesture (e.g., second gesture) that belongs to the preset gesture group. When the condition at S1220 is not met, the second device 200 may end the process of performing communication service.

When the condition at S1220 is met, at S1230, the second device 200 may determine whether or not the initialization of connection between devices is necessary. For example, the initialization of connection between the devices are not necessary when the communication link is already formed between the second device 200 and one or more adjacent devices (e.g., first device 100), in which case, the second device 200 at S1255 may transmit the second motion information to the first device 100 via the communication link.

Further, when the initialization of the connection between the devices is necessary, at S1240, the second device 200 may activate the communicator 220 (e.g., WiFi module 121) and search SSID broadcasts from the adjacent devices. At S1245 the second device 200 may receive SSID broadcast from the first device 100.

At S1250, the second device 200 may form communication link that may use a secured data channel, by the operations of transmitting a request for communication connection, pairing between the first device 100 and the second device 200, etc.

Further, the devices may keep security on the communication link using a preset encryption, password or hash table corresponding to encryption sequence (or encrypted channels). Further, at S1250, an additional process may be included in the second device 200, which is, to receive an input from the user of the second device 200 regarding a password designated by the user of the first device 100, which is the master. Further, the operation at S1250 may skip pairing process.

At S1255, the second device 200 may transmit the second motion information to the first device 100 via the communication link. Further, the second device 200 may drive a timer at a time point when the second motion information is transmitted.

At S1260, the first device 100 may determine if the second motion corresponds to the gesture (e.g., second gesture) that belongs to the preset gesture group, and if the difference between the time point of detecting the first motion and the time point of detecting the second motion is smaller than a preset time.

When the condition at S1260 is not met, at S1265, the first device 100 may transmit a condition mismatch reply to the second device 200, and end the process of performing communication service. At S1265, the second device 200 receiving the condition mismatch reply from the first device 100 may end the process of performing communication service.

Further, when the condition at S1260 is not met, the operation at S1265 may be omitted. When the timer driven at S1255 passes the preset time, the second device 200 may determine that the condition for performing communication service is not met, and therefore, end the process of performing communication service.

When the condition at S1260 is met, at S1270, the first device 100 may transmit a condition match reply to the second device 200.

At S1275, the second device 200 may determine whether or not it receives the condition match reply. As explained above, the second device 200 may end the process of performing communication service when the condition mismatch reply is received or when the timer is elapsed.

When the condition match reply is received, at S1280, the first device 100 and the second device 200 may perform an event that corresponds to a combination of the first and second gestures. For example, the event may include exchanging data that are respectively designated at the first device 100 and the second device 200.

Figure 13:
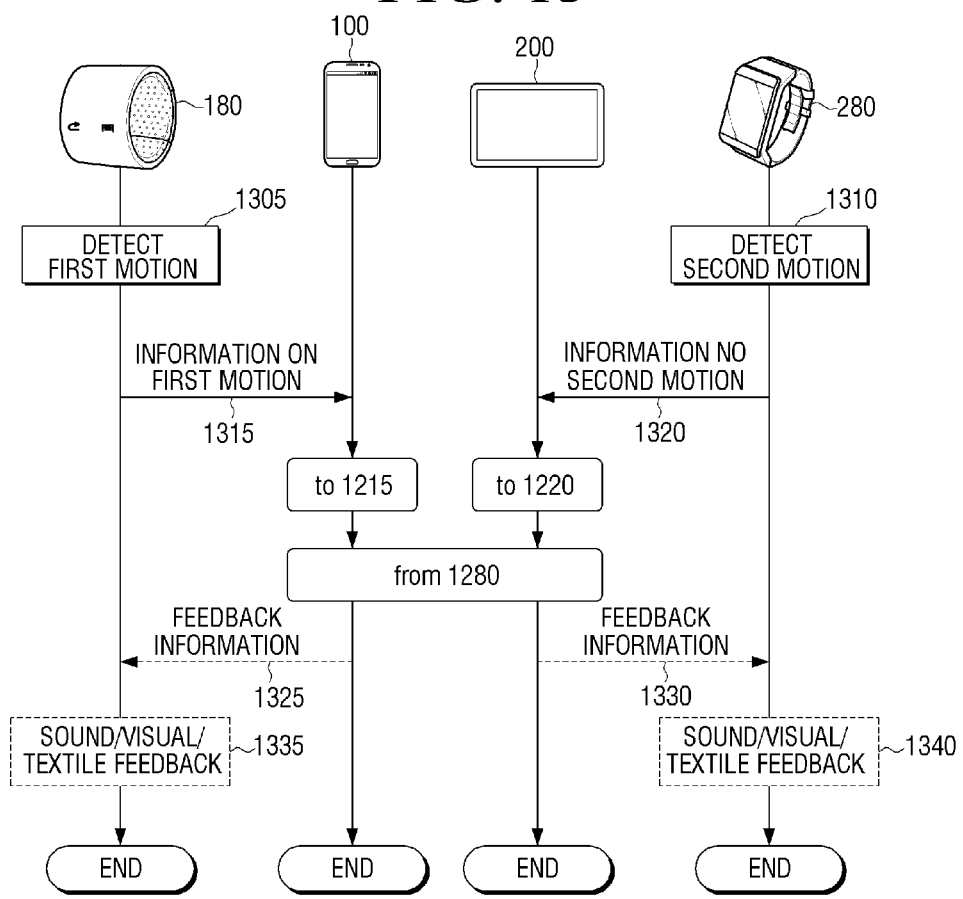
FIG. 13 illustrates a process of a communication service performed between a first device and a second device according to another exemplary embodiment.

FIG. 13 illustrates a process of performing communication service between the first device 100 and the second device 200, according to an exemplary embodiment. Referring to FIG. 3A, it is assumed that the first accessory is worn on the wrist of the first user, the second accessory is worn on the wrist of the second user, and the difference between the time point of detecting the first motion and the time point of detecting the second motion is smaller than a preset time.

The communication link may be formed between the first accessory and the first device 100, or between the second accessory and the second device 200 in near distance communication manner such as WiFi or Bluetooth communication. The first accessory and the first device 100, or the second accessory and the second device 200 may be within a communicable distance to each other.

At S1305, the first accessory may sense the first motion. The first motion may include first shape information of part of body of the first user (e.g., hand or forger shape), first acceleration information with respect to the first accessory, or first direction information representing a direction where the first accessory moves.

At S1315, the first accessory may transmit information about the first motion ('first motion information') to the first device 100. Further, the first device 100 may receive the first motion information from the first accessory. The first device 100 may start S1215 of FIG. 12 and proceed to the operation to perform a communication service.

At S1310, the second accessory may detect the second motion. The second motion may include second shape information about a part of a body of the second user (e.g., hand or finger shape), second acceleration information with respect to the second accessory, or second direction information representing a direction where the second accessory moves.

At 51320, the second accessory may transmit information about the second motion ('second motion information') to the second device 200. Further, the second device 200 may receive the second motion information from the second accessory. The second device 200 may enter S1220 of FIG. 12 and proceed to the operation of performing communication service.

Referring to FIG. 12, the operations between S1215 and S1280 with respect to the first device 100, or the operations between S1220 and S1280 with respect to the second device 200 may be performed.

Referring to FIG. 13, as the event that corresponds to the combination of the first and second gestures is performed, at S1325, the first device 100 may transmit feedback information that corresponds to the performed event (or feedback according to result of the event) to the first accessory. The first accessory may receive the feedback information from the first device 100.

At S1335, the first accessory may provide the user with at least one of sound feedback, visual feedback, and tactile feedback, according to the feedback information.

Further, at S1330, the second device 200 may transmit the feedback information that corresponds to the performed event to the second accessory. The second accessory may receive the feedback information from the second device 200.

At S1340, the second accessory may provide the user with at least one of the sound feedback, visual feedback and tactile feedback, according to the feedback information.

Further, the operations S1325 and S1335, or the operations S1330 and S1340 may be omitted.

Figure 14:
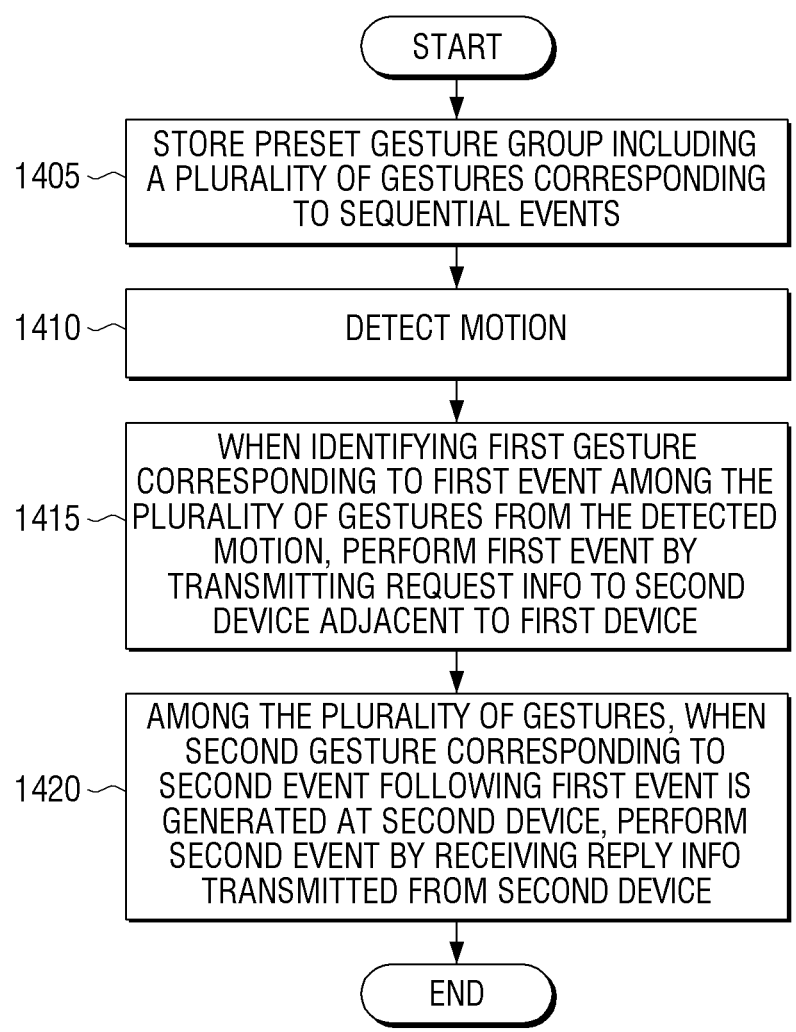
FIG. 14 illustrates a process of a communication service performed at a first device according to another exemplary embodiment.

FIG. 14 is a flowchart of a method for performing a communication service at the first device 100, according to another exemplary embodiment.

At S1405, the first device 100 may store (or retain) a preset gesture group that includes a plurality of gestures corresponding to sequential events.

At S1410, the first device 100 may detect a motion with respect to a user's body (or part of the user's body) or the first device 100.

At S1415, when identifying the first gesture that corresponds to the first event from the detected motion among the plurality of gestures, the first device 100 may perform the first event of transmitting request information to the second device 200 which is located adjacent to the first device 100. The communication link may already be formed between the first device 100 and the second device 200 before S1415.

The request information may include information on an event mapped with the first gesture. For example, the request information may require the one or more adjacent devices linked to the first device 100 by the communication link to answer with "Yes" or "No" to the preset service. The request information may include a request to participate in the social network service that is designated at the first device 100.

At S1420, when the second gesture that corresponds to the second event following the first event is generated among the plurality of gestures, the second event may be performed so that the first device 100 may receive reply information transmitted from the second device 200.

For example, the reply information may include a reply such as acceptance or refusal of the request to participate in the designated social network service.

Figure 15:
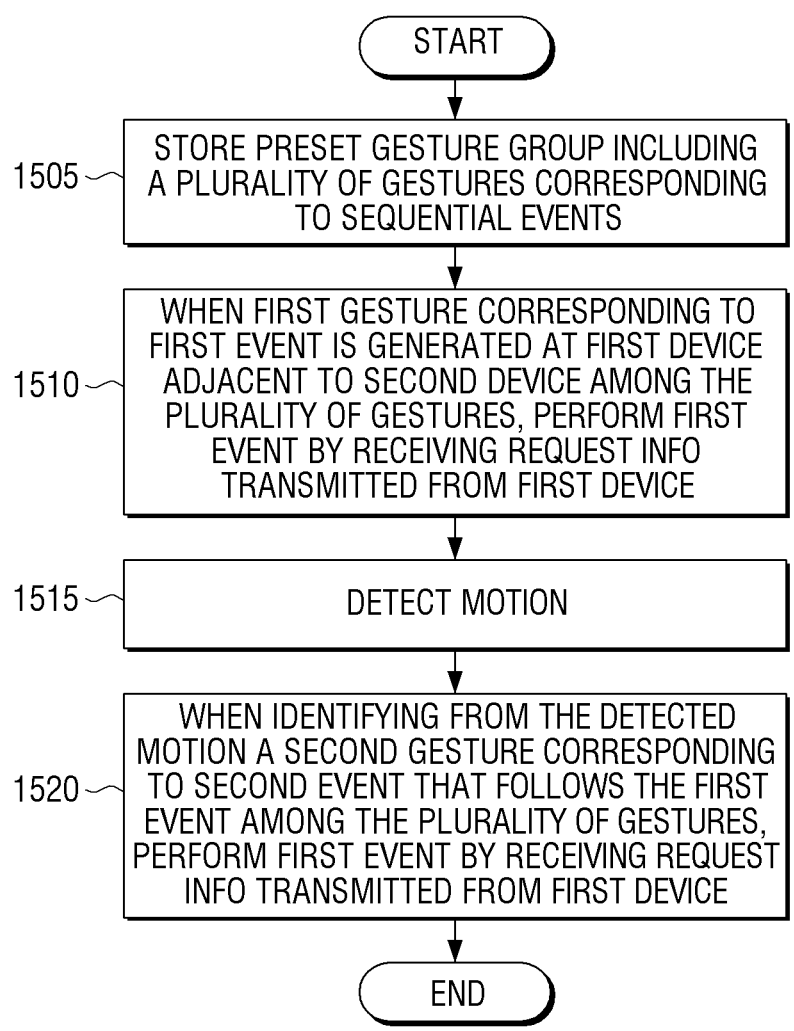
FIG. 15 illustrates a process of a communication service performed at a second device according to another exemplary embodiment.

FIG. 15 is a flowchart of a method for performing a communication service at the second device 200, according to another exemplary embodiment.

At S1505, the second device 200 may store a preset gesture group that includes a plurality of gestures corresponding to sequential events.

At S1510, when the first gesture that corresponds to the first event is generated among the plurality of gestures at the first device 100 located adjacent to the second device 200, the first event may be performed so that the second device 200 may receive the request information transmitted from the first device 100. For example, the request information may include a request to participate in the social network service designated at the first device 100.

At S1515, the second device 200 may detect a motion with respect to the user's body (or a part of the user's body) or the second device 200.

At S1520, when identifying the second gesture that corresponds to the second event following the first event from the detected motion among the plurality of gestures, the second device 200 may transmit the reply information that corresponds to the request information to the first device 100.

For example, when the request information includes a request to participate in the designated social network service, the second gesture may include a gesture that indicates one of acceptance and refusal. When the other gestures are generated, the second event is not performed, but ignored. When the second gesture is identified, the second device 200 may transmit reply information indicating either acceptance or refusal to the first device 100.

Figure 16:
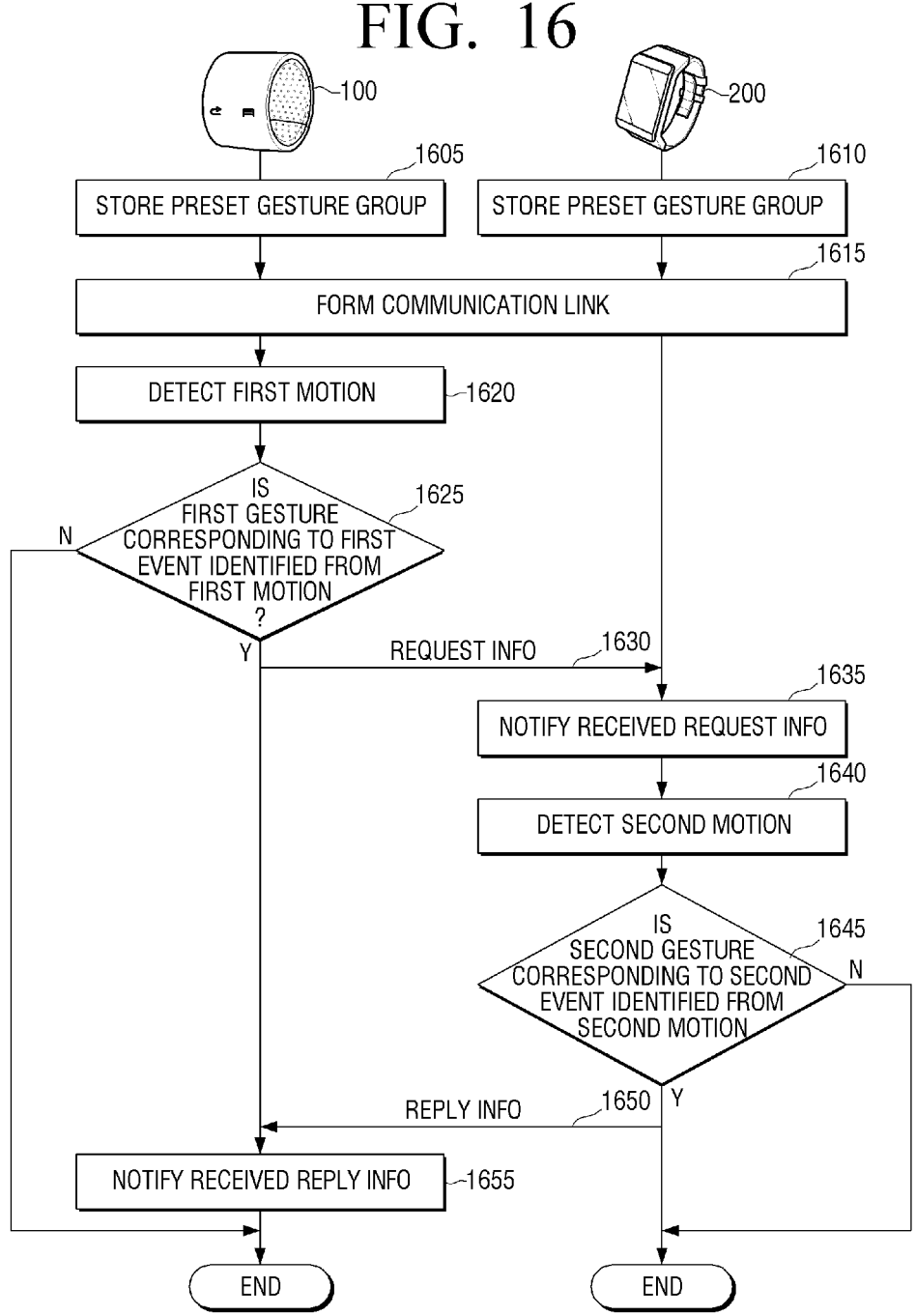
FIG. 16 illustrates a process of a communication service performed between a first device and a second device according to another exemplary embodiment.

FIG. 16 illustrates a process of performing communication service between the first device 100 and the second device 200, according to another exemplary embodiment.

At S1605, the first device 100 may store a preset gesture group that includes a plurality of gestures corresponding to sequential events. Further, at S1610, like S1605 of the first device 100, the second device 200 may store the preset gesture group.

At S1615, the first device 100 and the second device 200 may form a communication link according to the connecting process as required by the designated communication method.

At S1620, the first device 100 may sense the first motion with respect to the body of the first user (or part of the body of the first user) or the first device 100.

At S1625, the first device 100 may determine whether or not it identifies the first gesture that corresponds to the first event, from the first motion. When the condition at S1625 is not met, the first device 100 may end the process of performing communication service.

When identifying the first gesture from the first motion, at S1630, the first event may be performed so that the first device 100 may transmit request information to the second device 200. The second device 200 may receive the request information from the first device 100.

At S1635, the second device 200 may notify the user about the received request information using at least one of the visual feedback, sound feedback and tactile feedback. Further, the operation at S1635 may be omitted depending on the embodiments.

At S1640, the second device 200 may detect the second motion with respect to the body of the second user (or part of the body of the second user) or the second device 200.

At S1645, the second device 200 may determine whether or not it identifies the second gesture that corresponds to the second event from the second motion. When the condition at S1645 is not met, the second device 200 may end the process of performing communication service.

When identifying the second gesture from the second motion, at S650, the second event may be performed so that the second device 200 may transmit reply information to the first device 100. The first device 100 may receive the reply information from the second device 200.

At S1655, the first device 100 may notify the user with the received reply information using at least one of the visual feedback, sound feedback and tactile feedback.

Further, as explained above with reference to FIGS. 2, 9 and 13, one of common knowledge may understand that at least one of the first device 100 and the second device 200 may receive information about the motion from the accessory and perform the process explained above.

Figure 17:
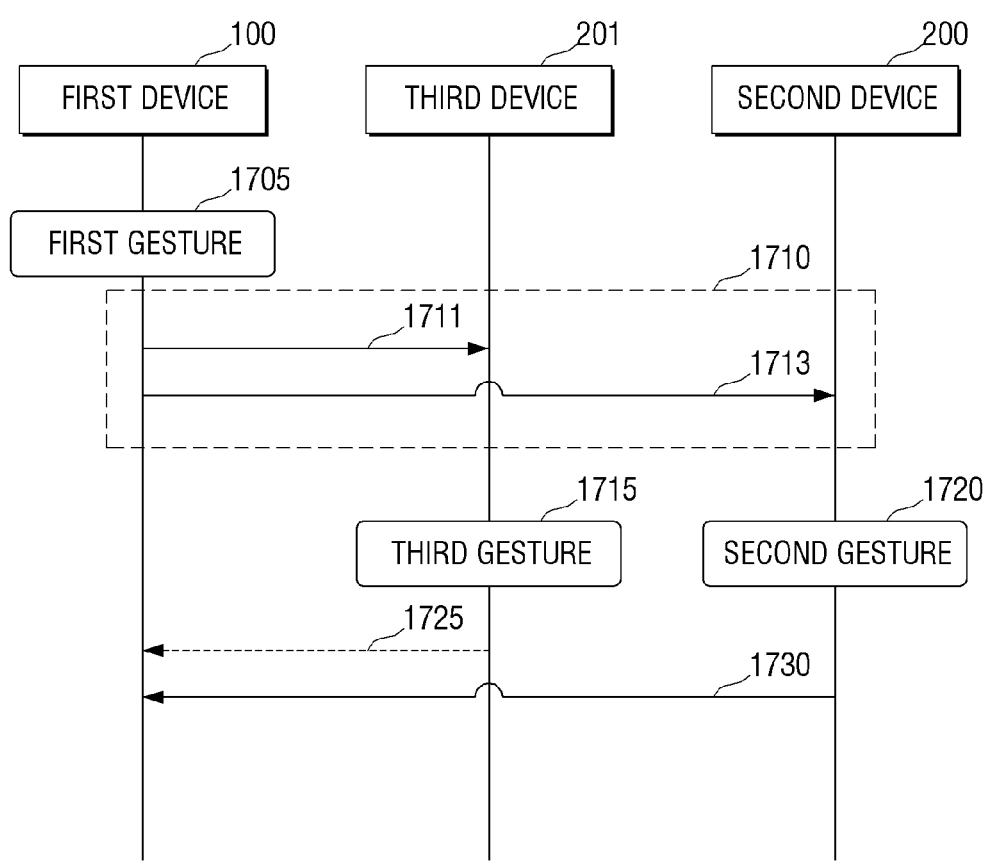
FIG. 17 illustrates a process of a communication service performed between a first device and a second device according to another exemplary embodiment.

Hereinbelow, the process of performing communication service between first device 100 and second device 200 according to another exemplary embodiment, and gestures will be explained with reference to FIGS. 17 and 27.

Figure 27:
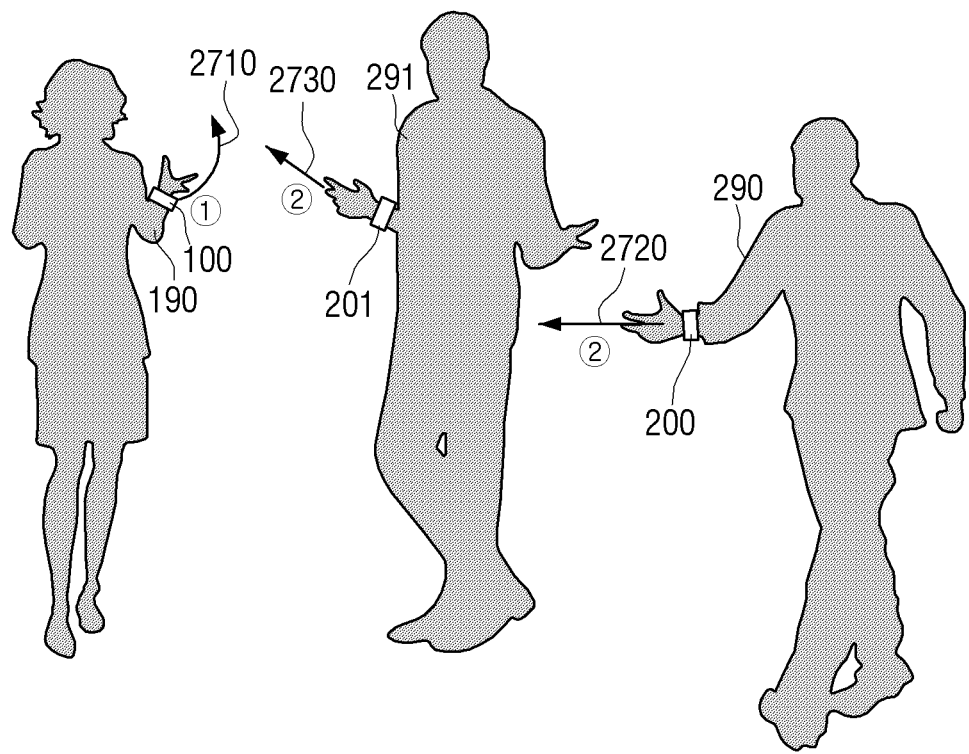
FIG. 27 illustrates gestures according to yet another exemplary embodiment.

Referring to FIG. 27, the first user 190 may wear the first device 100 on her, the second user 290 may wear the second device 200 on him, and the third user 291 may wear a third device 201 on him.

There may be the first event that the first device 100 transmits request information and the second event following the first event that the second device 200 transmits reply information. For example, the request information may include a request to participate in designated social network service, and the reply information may include reply that indicates either acceptance or refusal to the request to participate in the designated social network service.

At S1705, the first device 100 may sense the motion with respect to the movement of the first user or the first device 100 and recognize the first gesture 2710 from the motion that corresponds to the first event. The first gesture may be the gesture of the first user who unfolds his hand and moves it upward.

At S1710, the first event may be performed so that the first device 100 may transmit the request information to the connected devices using a previously formed communication link. For example, at S1711, the first device 100 may transmit the request information to the third device 201. Further, at S1713, the first device 100 may transmit the request information to the second device 200.

The operations at S1715 and S1720 may occur within a preset time, or substantially simultaneously. Further, at least one of the second and third events may be occur, following the first event.

At S1720, the second device 200 may sense the motion of the second user or motion with respect to the second device 200, and identify the second gesture 2720 from the motion that corresponds to the second event. The second gesture 2720 may be the gesture of the second user who unfolds his hand and moves it forward. The second gesture 2720 may indicate acceptance of the request to participate in service.

At S1730, the second event may be performed so that the second device 200 may transmit the reply information to the first device 100.

At S1715, the third device 201 may sense motion of the third user 291 or motion with respect to the third device 201, and identify the third gesture 2730 from the motion that corresponds to the third event. The third gesture 2730 may be the gesture of the third user who unfolds his hand and moves it to the side. The third gesture 2730 may indicate refusal to the request to participate in service.

At S1725, the third event may be performed so that the third device 201 may transmit the reply information to the first device 100. Further, the operation at S1725 may be omitted. That is, the first device 100 may drive a timer at S1711 and determine that the request to participate in service is refused when no reply information is received from the third device 201 until the elapse of a preset time of the timer.

As explained above, the users may generate events among the devices as they intend, in a natural way by using the gestures or sign language that people naturally use in conversation.

The gestures and events according to an exemplary embodiment will be explained in detail below with reference to FIGS. 18A to 26.

Gestures may include one or more independent gestures and a plurality of sub gestures. A device may retain in a memory one or more combinations of the plurality of sub gestures that belong to the preset gesture group. The combination of the two or more sub gestures may correspond to an event which is preset in association with the communication service. Further, separately from the one or more combinations of the plurality of sub gestures, the device may additionally retain one or more independent gestures in the memory.

Hereinbelow, an example will be explained, where the gestures are generated at two or more devices substantially simultaneously. It may be determined that the gestures are generated substantially simultaneously, when the difference between the time points of detecting the motions corresponding to the gestures is smaller than a preset time (e.g., 500 m sec). It may also be determined that the gestures are generated substantially simultaneously, when the difference between the time points of generating the gestures is smaller than a preset time.

The combinations of gestures may include substantially identical gestures. For example, when the preset, identical gestures are generated at the devices, corresponding to the combinations of the gestures, an event may be performed so that the devices share the business cards, phonebook (or contact) information, or contents. Further, along with the event, the devices may respectively display on respective display screens the graphics that can represent the users of the devices as a group, or the identical feedback effect such as vibration in unison.

Figure 18A:
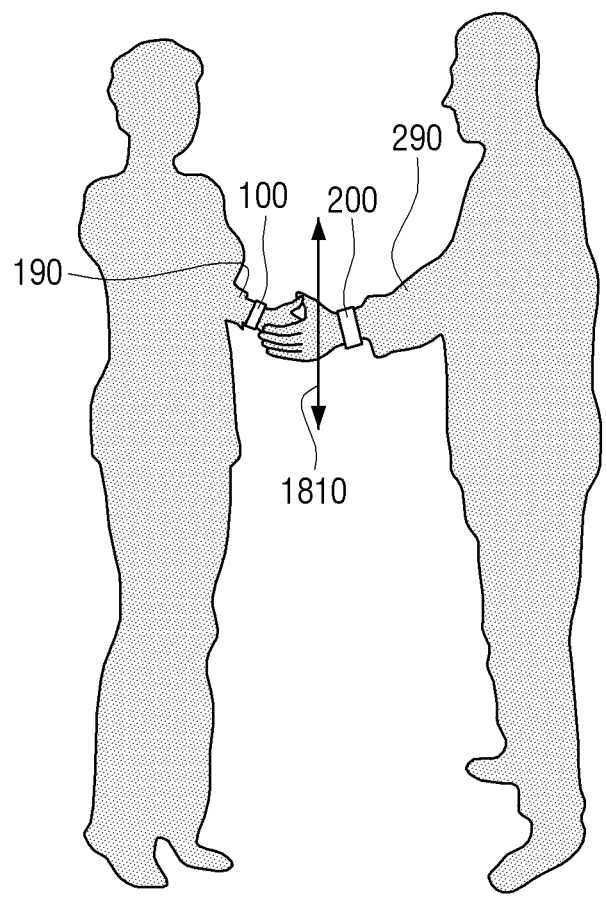
FIGS. 18A and 18B illustrate gestures according to an exemplary embodiment.
Figure 18B:
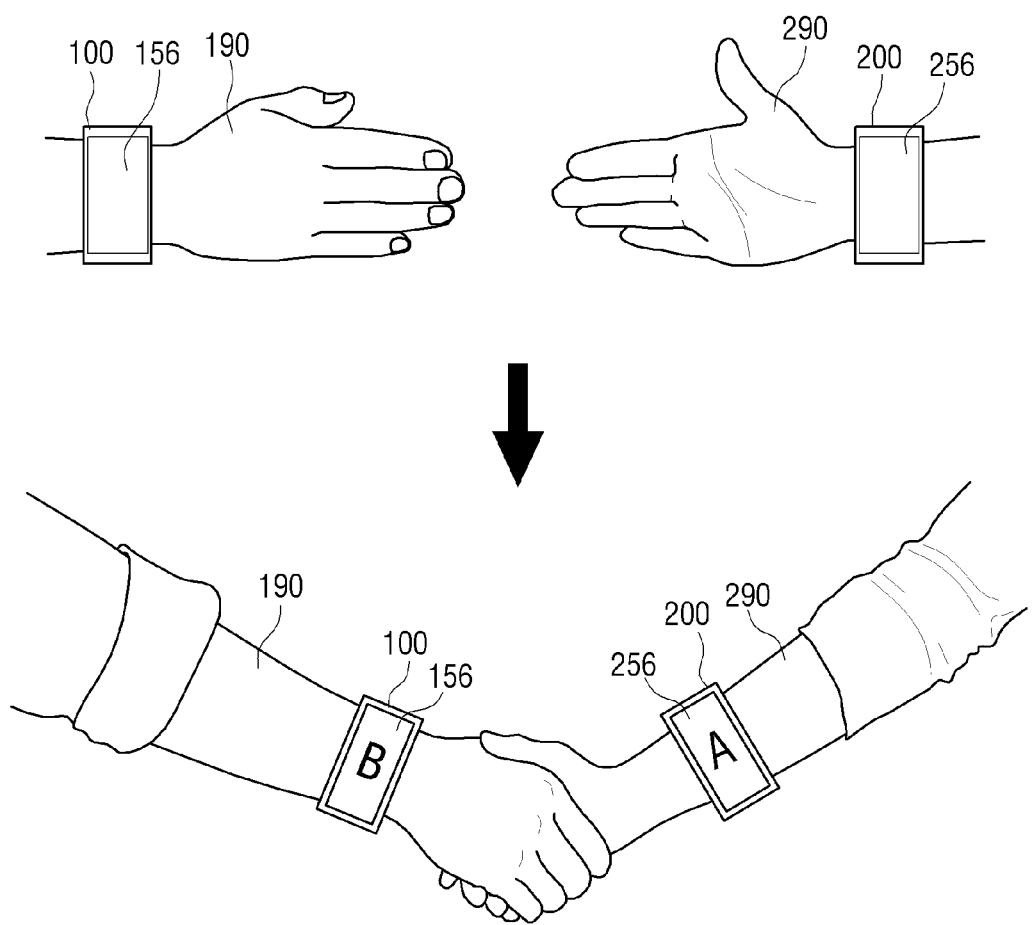

Referring to FIGS. 18A and 18B, the first user 190 may wear the first device 100, while the second user 290 may wear the second device 200. The gesture corresponding to the motions of the two users may represent a handshake. The gesture 1810 may represent the motion of the two users who hold each other's hands and move the hands up and down. Further, the gesture 1810 may represent the motion, or part of the motion that combines the motion of unfolding a hand and putting it forward, and motion of the two devices moving up and down. The first device 100 and the second device 200 may sense variations in the shape or form of the user's hands, using the electromyogram sensor 111 or the optical sensor 112, or sense the acceleration or the direction, using acceleration sensor 113 or the gyro sensor 114.

Further, until identification of the gesture 1810 from the motion detected at the first device 100 and the second device 200, the display screen 156 of the first device 100 and the display screen 256 of the second device 200 may display designated contents, respectively. As explained above with reference to FIG. 12, when the gestures identified at the first device 100 and the second device 200 meet the condition for performing a communication service, an event that corresponds to a combination of the gestures (e.g., handshake gestures) is performed, so that the first device 100 displays the information about the second user on the display screen 156 and the second device 200 displays the information of the first user on the display screen 256.

Figure 19:
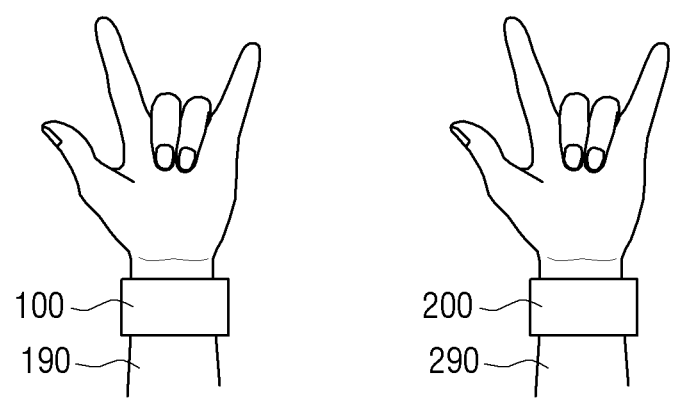
FIG. 19 illustrates gestures according to another exemplary embodiment.

Referring to FIG. 19, the first user 190 wearing the first device 100 and the second user 290 wearing the second device 200 may cause a preset communication service to start by making the same hand shape. For example, the device may perceive the user's sign language and cause the communication service with the counterpart device to begin. To sense the hand shape, the first device 100 and the second device 200 may acquire information about the motion including myogram signals.

Figure 20:
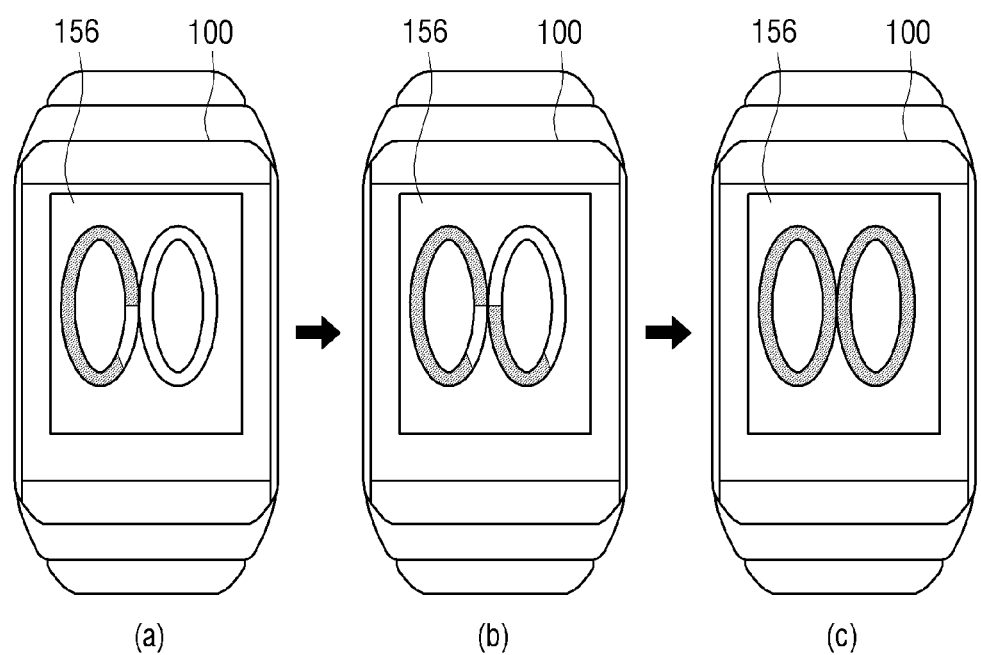
FIG. 20 illustrate visual feedback at a device configured to perform a communication service according to an exemplary embodiment.

Further, referring to FIG. 20, when the gesture that belongs to the preset gesture group is identified, the display screen 156 of the first device 100 may show the Mobius strip with partially varying visual effect (see (a) of FIG. 20). Further, when the process to form a communication link between the first device 100 and the second device 200 is performed, the visual effect as the one illustrated in (b) of FIG. 20 may appear, and the visual effect as the one illustrated in (c) of FIG. 20 may then appear when the communication link is completely formed between the two devices. Further, after the communication service of exchanging business cards in accordance with handshaking is completed, the first device 100 or the second device 200 may record the log of the frequency of meeting the user of the counterpart device.

Referring to FIG. 21, the first user, 190, the second user 290, the third user 291, and the fourth user 292 may wear the first device 100, the second device 200, the third device 201, and the fourth device 202 on their wrists (or arms), respectively.

The gesture 2105 may be a high-five gesture that users unfold their hands and raise the hands upward. As an event that corresponds to the combination of the high-five gestures, a group is formed among the devices or the users and the group may share the information. For example, when the communication link is formed between devices as illustrated in (a) of FIG. 21, or as an event that corresponds to a combination of the gestures, the display screens 156, 256, 266, 276 of the first device 100, the second device 200, the third device 201, and the fourth device 202 may display the graphics that are connected to each other to thus represent homogeneity.

Referring to (a) to (c) of FIG. 21, contents may be shared or different designated images may be distributed. For example, when there is a WiFi direct communication link formed, a master device may access the memory for the contents according to the number of the devices in the group, and transmit the contents to the rest of the slave devices excluding the master, in an arbitrary order. Further, the master device may transmit partial or entire content to the slave devices to control that different parts of the content are displayed, respectively. Further, the master device may also control that the same content is shared with the slave devices.

After the group 2110 of the first device 100, the second device 200, the third device 201 and the fourth device 202 is formed, referring to (b) of FIG. 21, the devices may display on the display screens the texts, images or contents like the card sections showing chants for the team the group is cheering for. For example, the text may include {"Go", "!", "Lions", "!"}, {"We", "be", "back!"}; or {"Fighting", "We", "are", "ONE"}.

Referring to (d) of FIG. 21, another group 2120 of the devices may display different contents or information. Accordingly, the function of performing a communication service based on gestures according to an exemplary embodiment may be easily utilized for displaying information about the games among the groups or tasks given to the groups.

When the communication link is formed in a group, the respective devices may recognize the gesture 2115. The gesture 2115 may include a low-five gesture where users unfold their hands and hold theirs hands down. As an event that corresponds to the combination of the low-five gestures, the group may be disbanded. Referring to (c) of FIG. 21, according to the event of disbanding a group, the display screens may respectively display an image that represents homogeneity.

Further, the combination of the gestures may include gestures with substantially identical trajectory (or acceleration), and with opposite directions of motions. For example, when the gestures with substantially identical shapes and opposite directions are generated at the devices, in response to the combination of the gestures, an event may be performed, in which one device may transmit the contents to another in accordance with the direction of the gesture, or one device may be disbanded from the group of social network service, or one device may cancel content transmission. Further, along with the event, the graphics, tactile feedback, or sound effect that corresponds to the sensation of the event, may be provided.

Referring to FIGS. 22A to 24, the first user 190 and the second user 290 may wear the first device 100 and the second device 200 on their wrists (or arms), respectively.

Figure 22A:
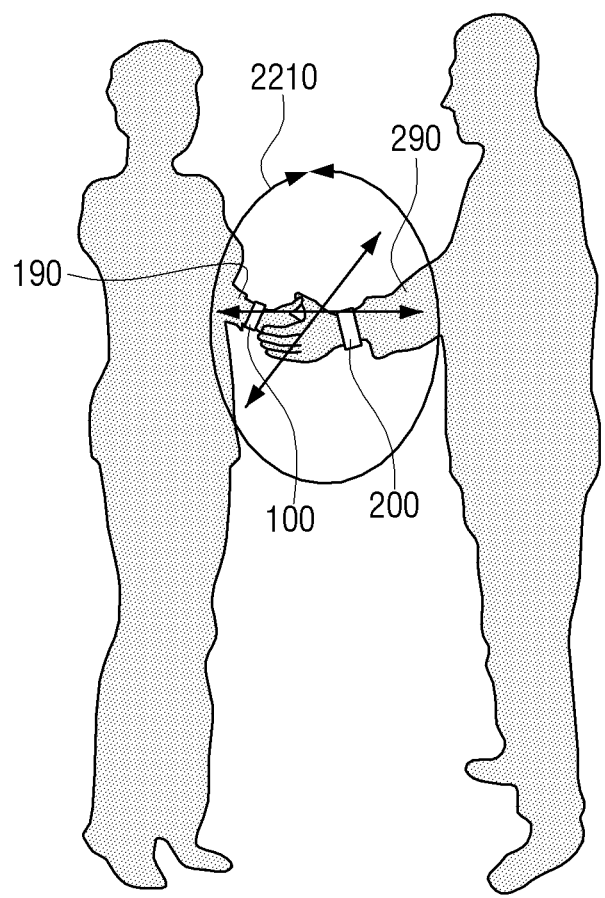
FIGS. 22A and 22B illustrate gestures according to another embodiment.
Figure 22B:
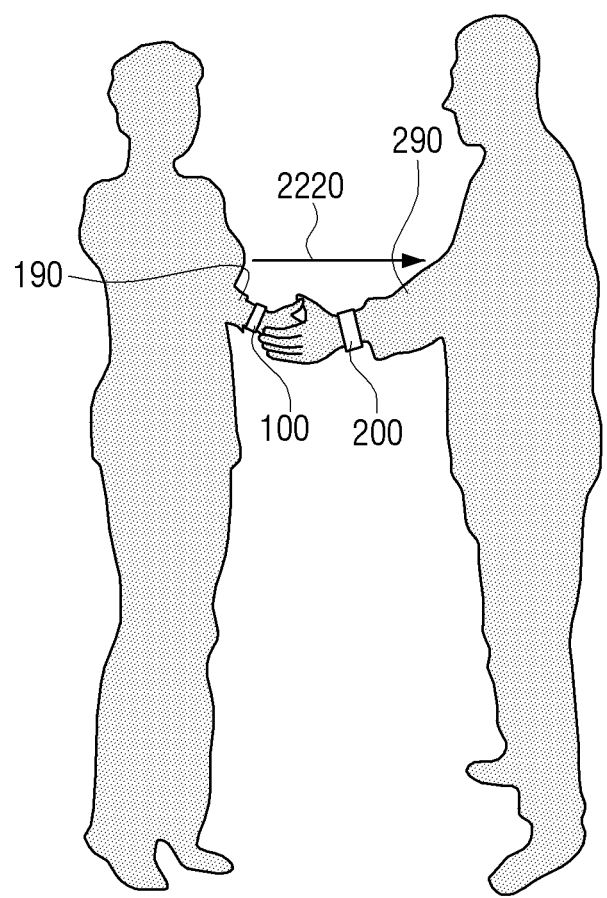

Referring to FIG. 22A, the gestures 2210 may correspond to a combination of gestures with substantially identical trajectory (or acceleration) and opposite directions of motions, which may include a rotational gesture that users holding hands with each other and rotate the hands to one direction, directional gestures that users shake or move hands to the left or right, or pulling or pushing gestures that a user pulls (or pushing) hand close to or far away from another user. For example, FIG. 22B illustrates pulling gestures 2220 that corresponds to a combination of gestures. The first device 100 may detect the motion of the first device 100 and identify the first pulling gesture from the detected motion. The second device 200 may detect the motion of the second device 200 moving to the direction of the first user 190 and identify the second pulling gesture from the detected motion. In this case, an event may be performed in response to the combination of the gestures, so that the contents designated in the first device 100 may be transmitted to the second device 200.

Figure 23:
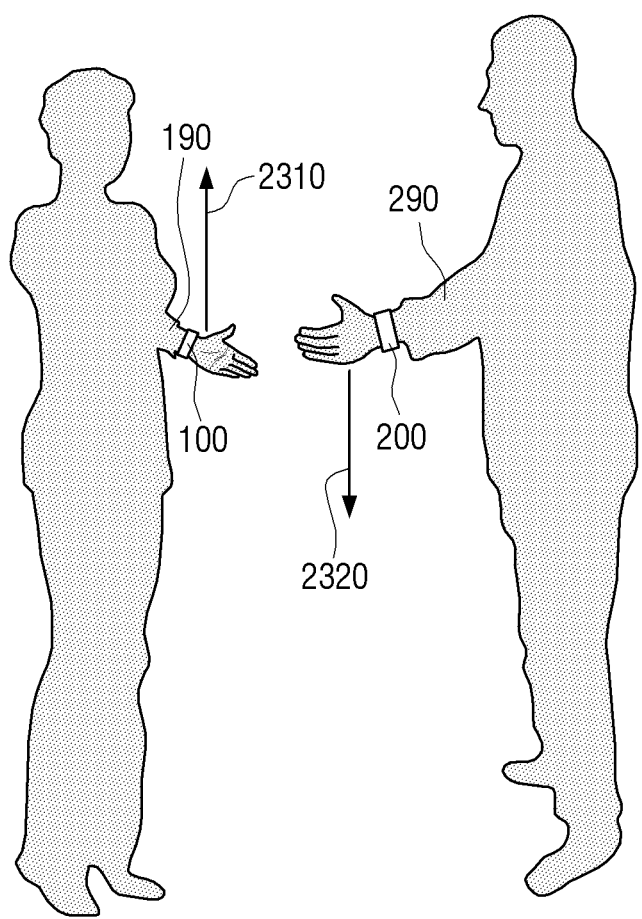
FIG. 23 illustrates gestures according to yet another exemplary embodiment.

Further, referring to FIG. 23, the gesture 2310 where the first device 100 is moved by the first user 190 upward, may occur substantially simultaneously with the gesture 2320 where the second device 200 is moved by the second user 290 downward.

Figure 24:
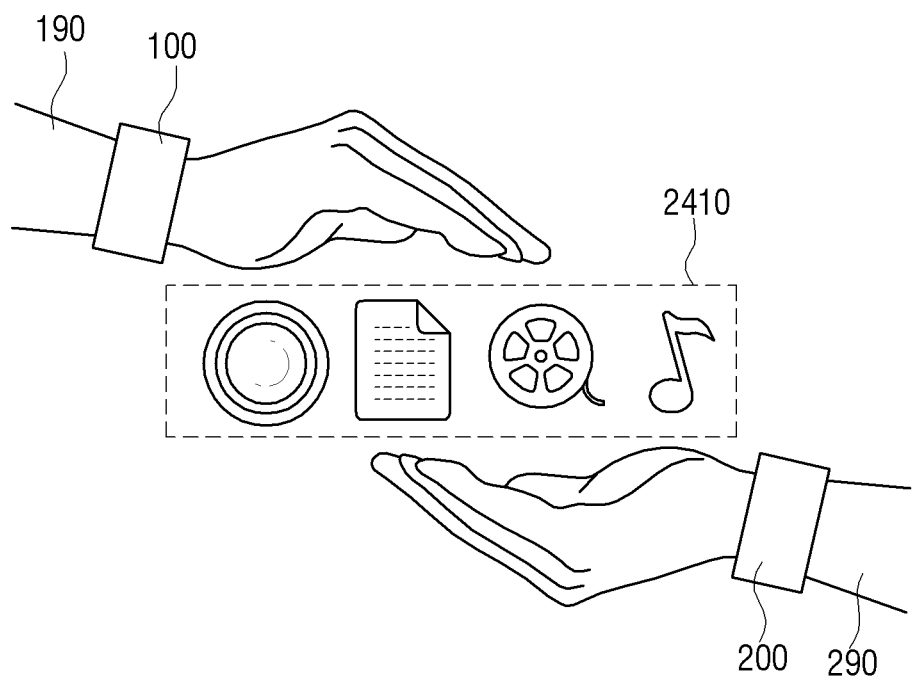
FIG. 24 illustrates gestures according to yet another exemplary embodiment.

Further, the first gesture that the hand of the first user 190 faces down in the form as illustrated in FIG. 24, and the second gesture that the hand of the second user 290 faces up in the form illustrated in FIG. 24, may be generated. At this time, the first device 100 and the second device 200 may respectively detect the information about the motions which may include the shape of the hand which may be detected using an electromyogram sensor or optical sensor, direction of the hand which may be detected using a gyro sensor or acceleration sensor, altitude information of the device which may be detected using altitude sensor, or comparative position which may be detected in a perpendicular direction to a counterpart device, and identify the gesture from the detected information.

For example, when the first and second gestures as the ones illustrated in FIG. 24 are generated, the first device 100 may operate as a master of a communication network, and the second device 200 may operate as a slave. The first device 100 may transmit stored contents 2410 to the second device 200 in one way manner. Further, as explained above, the devices may be connected one-to-one or one-to-many (N) in a group for performing of a communication service.

Further, the combination of gestures may include gestures with different trajectories. When gestures of the preset gesture group with different trajectories occur at the devices, an event that corresponds to the combination of the gestures may be performed. For example, the event may include controlling of a game that a plurality of users play, or generating the respective gestures of the users into musical beats, or composing or playing music.

Figure 25:
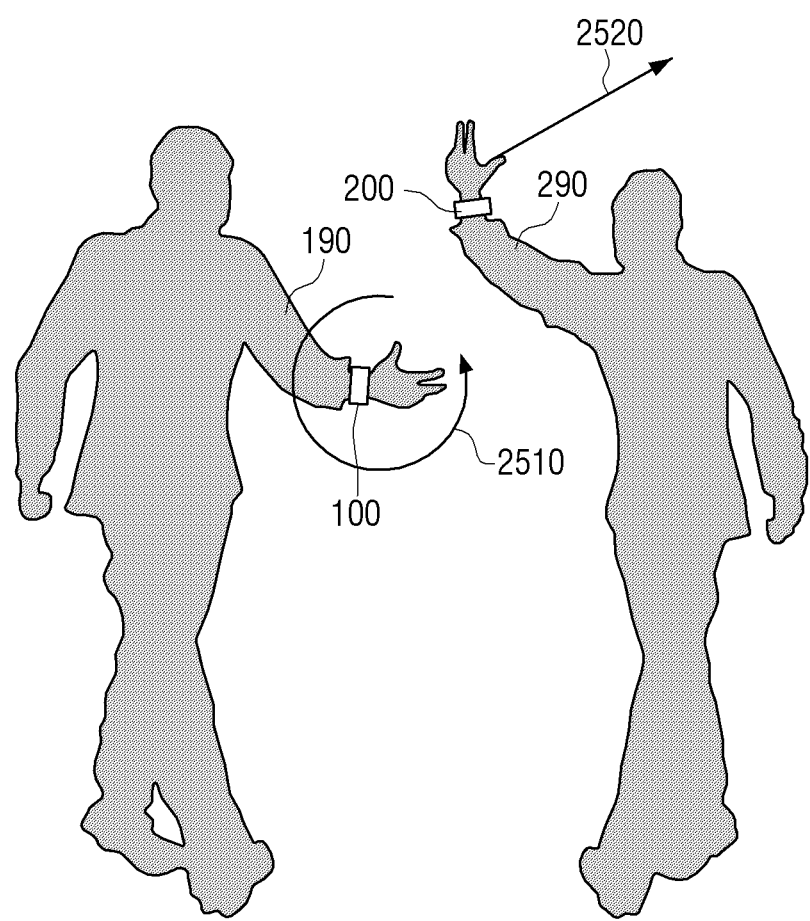
FIG. 25 illustrates gestures according to yet another exemplary embodiment.

Referring to FIG. 25, the combination of gestures may include a gesture 2510 that the first user 190 wearing the first device 100 raises his hand in a curved line, and a gesture 2520 that the second user 290 wearing the second device 200 puts his hand down or backward.

Figure 26:
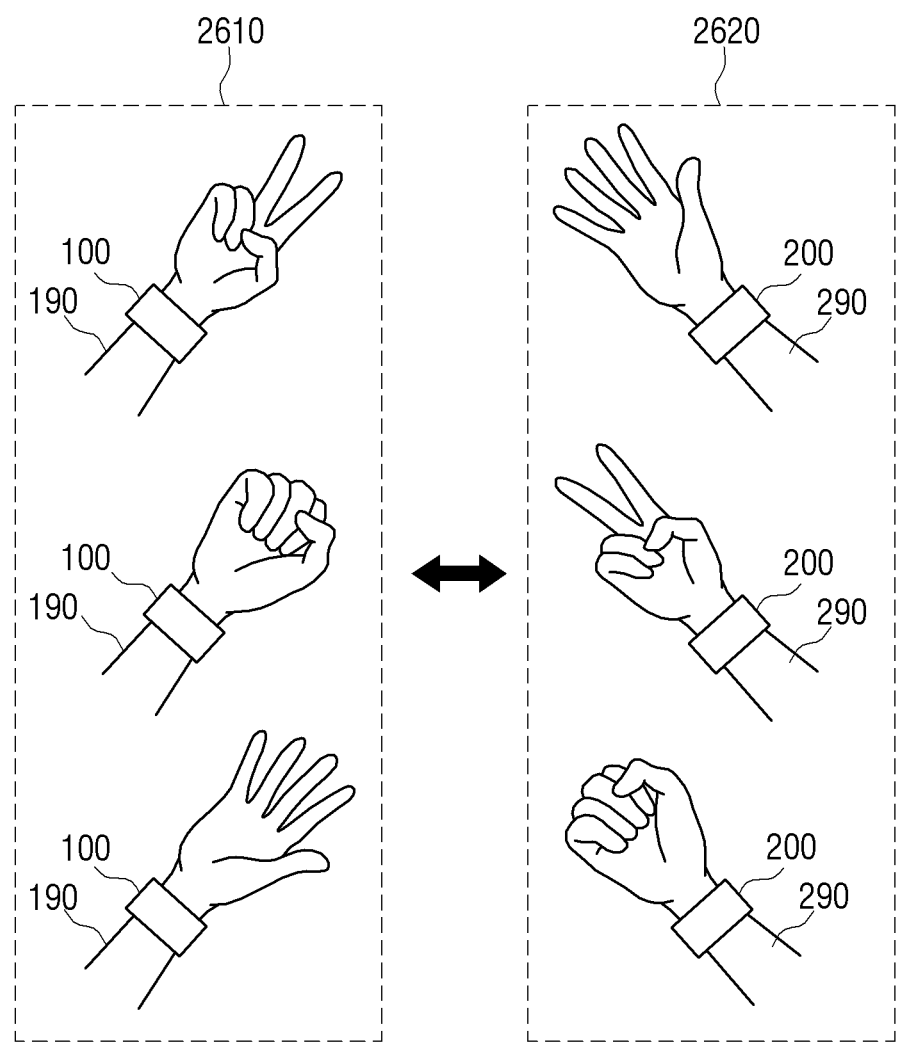
FIG. 26 illustrates gestures according to yet another exemplary embodiment.

Referring to FIG. 26, the rock-paper-scissors game may be played, using one or more combinations of the gestures 2610, 2620. The first device 100 or the second device 200 may detect the shape of the hand as the information about the motion and identify a gesture based on the detected hand shape. As explained above with reference to FIG. 3B, the devices may perform an event according to the combination of gestures, by providing the respective users with feedbacks on a result (e.g., win, lose or draw) that corresponds to a combination of gestures.

Figure 28:
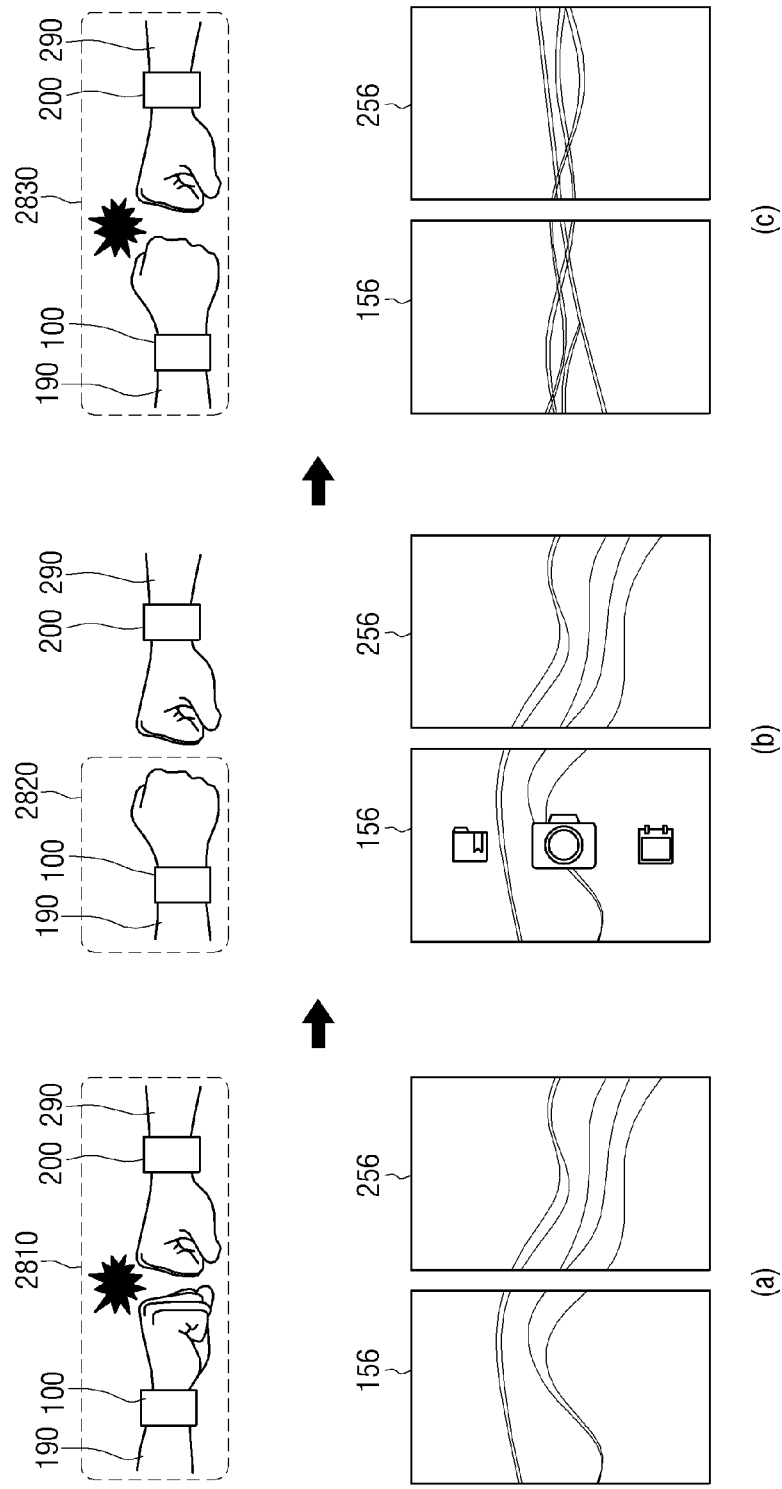
FIG. 28 illustrates services using various gestures according to an exemplary embodiment.

FIG. 28 illustrates service that uses various gestures according to an exemplary embodiment. An exemplary embodiment of performing communication service according to a combination of sub gestures or according to an independent gesture will be explained below.

The first device 100 may be worn on the body of the first user 190, while the second device 200 may be worn on the body of the second user 290.

For example, the sub gestures 2810 belonging to the preset gesture group may be substantially identical to each other. The sub gestures 2810 may include the gestures of the two users making identically-shaped hand shapes, or bump gestures of the users' fists that face each other. An event that corresponds to the bump gestures may include entering into a mode in which the first device 100 and the second device 200 have a synchronized designated data or folder. At this time, referring to (a) of FIG. 28, the display screen 156 of the first device 100 and the display screen 256 of the second device 200 may display graphic effects that represent the state that the two devices are being connected.

It is assumed that the first device 100 transmits contents, and the second device 200 receives the contents. Of course, the two devices may also transmit designated contents, respectively.

Referring to (b) of FIG. 28, a user interface may appear on the display screen 156, to allow selection of the content to be transmitted from the first device 100. According to the motion of the first user 190, an independent gesture 2820 may occur at the first device 100. The independent gesture 2820 may be the gesture that a user raises his hand to change a direction of the first device 100 arrangement. As an event that corresponds to the independent gesture 2820, the user interface appearing on the display screen 156 of the first device 100 may be controlled. For example, a user choice (or designation) with respect to contents such as files, camera images, or specific information may be changed depending on the rotational direction of the independent gesture 2820.

Further, the sub gestures 2830 that belong to the preset gesture group may include the substantially identical hand shape, and different arrangement directions. For example, the sub gestures 2830 may include the devices (or the fists of the users) arranged in different directions and the gestures of the two users who clench their fists and tap on each other's fists. As an event that corresponds to the combination of the sub gestures 2830, the first device 100 may transmit designated or selected contents to the second device 200. Referring to (c) of FIG. 28, the devices may display graphics that correspond to the event, to enable a user to know about the direction of data transmission, type of the data or data exchange event.

In addition to those exemplified above, various other gestures may be designated or stored in devices depending on the purpose of use or convenience. For example, a manufacturer or service provider may set gestures and store these in the devices in advance. Further, the devices may provide user interface so that users may set arbitrary gestures or edit and use the preset gestures.

Further, the process or operation of a method for performing a communication service explained above with reference to FIGS. 10 to 17 may have varied order of operations or partially omitted operations. Further, the operations may be performed according to a complex combination of some of the exemplary embodiments explained above. Further, one with common knowledge in the art will understand that the user interface may be modified in various manners according to modification or omission of the operations.

Further, one with common knowledge in the art will be able to understand that the program according to the exemplary embodiments explained above with reference to FIGS. 10 to 17 may be constructed based on software, hardware or a combination of the software and hardware. Further, the programs according to exemplary embodiments may be recorded on a recording medium, and downloaded from a server or a computer to a device or an accessory via communication network.

The foregoing exemplary embodiments and advantages are merely exemplary and are not to be construed as limiting the exemplary embodiments. The present teaching can be readily applied to other types of apparatuses. Also, the description of the exemplary embodiments of the present inventive concept is intended to be illustrative, and not to limit the scope of the claims.

What is claimed is:

1. A method for performing a communication service at a first device with a second device, the method comprising:
   detecting, by the first device, a first motion of the first device in a state that a communication link with the second device is not established;
   when the first motion of the first device corresponds to a first gesture that belongs to a predetermined gesture group, establishing, by the first device, the communication link with the second device;
   receiving, by the first device, information on a second motion of the second device through the communication link from the second device;
   determining, by the first device, whether the second motion of the second device corresponds to a second gesture that belongs to the predetermined gesture group based on the received information; and
   when the second motion of the second device corresponds to the second gesture that belongs to the predetermined gesture group, transmitting, by the first device, a condition match reply indicating that the second motion of the second device corresponds to the second gesture, to the second device and performing, by the first device, an event that corresponds to a combination of the first gesture and the second gesture.

2. The method of claim 1, wherein the first motion of the first device comprises at least one from among: first acceleration information with respect to the first device; and first direction information representing a direction where the first device moves, and
   the second motion of the second device comprises at least one from among: second acceleration information with respect to the second device; and second direction information representing a direction where the second device moves.

3. The method of claim 1, wherein the detecting the first motion comprises detecting at least one from among: first acceleration information with respect to the first device and first direction information representing a direction where the first device moves.

4. The method of claim 1, wherein the first device and the second device have at least one form from among a band shape, a wrist watch shape and a bracelet shape.

5. The method of claim 1, wherein the performing the event is implemented when the received information corresponds to the second gesture and when a difference between a time point of detecting the first motion of the first device that corresponds to the first gesture and a time point of detecting the second motion of the second device that corresponds to the second gesture, is smaller than a time.

6. The method of claim 1, wherein the receiving the information about the second motion of the second device comprises:
searching a service set identifier (SSID); and
when failing to find the SSID, broadcasting the SSID.

7. The method of claim 1, wherein the combination of the first gesture and the second gesture comprises first and second gestures which are substantially identical to each other.

8. The method of claim 1, wherein the combination of the first gesture and the second gesture comprises first and second gestures with substantially identical trajectory and opposite directions of motion.

9. The method of claim 1, further comprising: prior to the detecting the first motion of the first device, retaining, at a memory, one or more combinations of a plurality of gestures comprising the first gesture and the second gesture that belong to the gesture group.

10. The method of claim 9, wherein the one or more combinations comprise sub gestures generated at two or more different devices, and when the sub gestures are generated together, a corresponding event is performed.

11. The method of claim 9, further comprising additionally retaining, at the memory, one or more independent gestures that are generated at one device and that correspond to an input event made to a user interface of the one device, separately from the one or more combinations.

12. A first device for performing a communication service with a second device, the first device comprising:
a sensor which detects a first motion of the first device in a state that a communication link with the second device is not established;
a communication protocol module which, when the first motion of the first device corresponds to a first gesture that belongs to a predetermined gesture group, establishes the communication link with the second device and receives information on a second motion of the second device through the communication link from the second device; and
a processor which, when the received information corresponds to a second gesture that belongs to the predetermined gesture group, transmits a condition match reply indicating that the second motion of the second device corresponds to the second gesture, to the second device, and causes an event that corresponds to a combination of the first gesture and the second gesture to be performed.

13. The first device of claim 12, wherein the first motion of the first device comprises at least one from among: first acceleration information with respect to the first device; and first direction information representing a direction where the first device moves, and
the second motion of the second device comprises at least one from among: second acceleration information with respect to the second device; and second direction information representing a direction where the second device moves.

14. The first device of claim 13, wherein the sensor and another sensor of the second device each comprise at least one from among an optical sensor and an electromyogram sensor.

15. The first device of claim 12, wherein the sensor detects the first motion by detecting at least one from among: first acceleration information with respect to the first device and first direction information representing a direction where the first device moves.

16. The first device of claim 12, wherein the first device and the second device have at least one form from among a band shape, a wrist watch shape and a bracelet shape.

17. The first device of claim 12, wherein the processor controls so that the event is implemented when the received information corresponds to the second gesture and when a difference between a time point of detecting the first motion of the first device that corresponds to the first gesture and a time point of detecting the second motion of the second device that corresponds to the second gesture, is smaller than a time.

18. The first device of claim 12, wherein, prior to receiving the information about the second motion of the second device, the communication protocol module searches a service set identifier (SSID), and when failing to find the SSID, broadcasts the SSID.

19. The first device of claim 12, wherein the combination of the first gesture and the second gesture comprises first and second gestures which are substantially identical to each other.

20. The first device of claim 12, wherein the combination of the first gesture and the second gesture comprises first and second gestures with substantially identical trajectory and opposite directions of motion.

21. The first device of claim 12, further comprising a memory configured to retain one or more combinations of a plurality of gestures comprising the first and second gestures that belong to the gesture group, prior to the detecting the first motion of the first device.

22. The first device of claim 21, wherein the one or more combinations comprise sub gestures generated at two or more different devices, and when the sub gestures are generated together, a corresponding event is performed.

23. The first device of claim 21, wherein the memory additionally retains one or more independent gestures that are generated at one device and that correspond to an input event made to a user interface of the one device, separately from the one or more combinations.

24. A method for performing a communication service at a first device with a second device, the method comprising:
storing, by the first device, a gesture group that comprises a plurality of gestures corresponding to sequential events, the plurality of gestures including a first gesture and a second gesture;
detecting, by the first device, a motion at the first device in a state that a communication link with the second device is not established;
when identifying from the detected motion the first gesture that corresponds to a first event among the plurality of gestures, establishing, by the first device, the communication link with the second device and performing, by the first device, the first event by transmitting request information to the second device; and
when the second gesture corresponding to a second event following the first event is generated at the second device among the plurality of gestures, performing, by the first device, the second event of receiving reply information transmitted from the second device.

25. A first device for performing a communication service with a second device, the first device comprising:
- a memory which stores a gesture group that comprises a plurality of gestures corresponding to sequential events, the plurality of gestures including a first gesture and a second gesture;
- a sensor which detects a motion in a state that a communication link with the second device is not established;
- a processor which, when identifying, from the detected motion, the first gesture that corresponds to a first event among the plurality of gestures, establishes the communication link with the second device and causes the first event to be performed, in which request information is transmitted to the second device; and
- a communication protocol module which, when the second gesture corresponding to a second event following the first event is generated at the second device among the plurality of gestures, performs the second event of receiving reply information transmitted from the second device.

26. A method for performing a communication service at a second device with a first device, the method comprising:
- detecting, by the second device, a second motion of the second device in a state that a communication link with the first device is not established;
- when the second motion of the second device corresponds to a second gesture that belongs to a gesture group, establishing, by the second device, the communication link with the first device and transmitting, by the second device, information about the second motion of the second device through the communication link to the first device; and
- when detecting, at the first device, a first motion of the first device that corresponds to a first gesture belonging to the gesture group within a set time before or after detecting the second motion of the second device, performing, by the second device, an event that corresponds to a combination of the first and second gestures.

27. A second device for performing a communication service with a first device, the second device comprising:
- a sensor which detects a second motion of the second device in a state that a communication link with the second device is not established;
- a communication protocol module which, when the second motion corresponds to a second gesture that belongs to a gesture group, establishes the communication link with the first device and transmits information about the second motion through the communication link to the first device; and
- a processor which, when detecting, at the first device, a first motion of the first device that corresponds to a first gesture belonging to the gesture group within a time before or after detecting the second motion of the second device, causes an event that corresponds to a combination of the first gesture and the second gesture to be performed.

28. The method of claim 1, wherein the second device is located adjacent to the first device.

29. The method of claim 1, wherein the first gesture and the second gesture are performed substantially simultaneously.

30. The first device of claim 12, wherein the second device is located adjacent to the first device.

31. The first device of claim 12, wherein the first gesture and the second gesture are performed substantially simultaneously.

* * * * *